United States Patent
R et al.

(10) Patent No.: US 11,875,292 B2
(45) Date of Patent: *Jan. 16, 2024

(54) IMAGE-BASED DECOMPOSITION FOR FAST ITERATIVE SOLVE OF COMPLEX LINEAR PROBLEMS

(71) Applicant: Blue Yonder Group, Inc., Scottsdale, AZ (US)

(72) Inventors: Devanand R, Bangalore (IN); Narayan Nandeda, Ujjain (IN); Tushar Shekhar, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,749

(22) Filed: Feb. 20, 2023

(65) Prior Publication Data
US 2023/0196238 A1 Jun. 22, 2023

Related U.S. Application Data

(63) Continuation of application No. 17/745,305, filed on May 16, 2022, now Pat. No. 11,605,039, which is a (Continued)

(51) Int. Cl.
*G06Q 10/0631* (2023.01)
*G06Q 10/04* (2023.01)
*G06V 10/75* (2022.01)

(52) U.S. Cl.
CPC ....... *G06Q 10/06315* (2013.01); *G06Q 10/04* (2013.01); *G06Q 10/06313* (2013.01); *G06V 10/752* (2022.01)

(58) Field of Classification Search
None
See application file for complete search history.

(56) References Cited

U.S. PATENT DOCUMENTS 5,715,165 A * 2/1998 Luh .................. G06F 18/24317
700/173
6,701,201 B2 3/2004 Hegde et al.
(Continued)

FOREIGN PATENT DOCUMENTS

EP 266489 A * 5/1988 ............... B65B 9/02
EP 1677237 7/2006
(Continued)

OTHER PUBLICATIONS

Santoso, Tjendera, et al. "A stochastic programming approach for supply chain network design under uncertainty." European Journal of Operational Research 167.1 (2005): 96-115. (Year: 2005).*
(Continued)

*Primary Examiner* — Timothy Padot
*Assistant Examiner* — Derick J Holzmacher
(74) *Attorney, Agent, or Firm* — Spencer Fane LLP; Steven J. Laureanti

(57) ABSTRACT

A system and method are disclosed for solving a supply chain planning problem modeled as a linear programming problem. Embodiments include receiving a matrix formulation of at least a portion of the linear programming problem representing a supply chain planning problem for a supply chain network, generating an image based on the matrix formulation to identify connected components, partitioning the matrix formulation based, at least in part, on the connected components constraint into at least two partitions, formulating an linear programming subproblem from each of the at least two partitions, and solving the linear programming subproblems to generate a global solution to the supply chain planning problem.

20 Claims, 19 Drawing Sheets

Related U.S. Application Data continuation of application No. 16/886,684, filed on May 28, 2020, now Pat. No. 11,334,827.

(60) Provisional application No. 62/895,866, filed on Sep. 4, 2019, provisional application No. 62/856,360, filed on Jun. 3, 2019.

(56) References Cited

U.S. PATENT DOCUMENTS

| | | | |
|---|---|---|---|
| 7,103,436 B2* | 9/2006 | Denton | G06Q 10/00 700/103 |
| 7,219,068 B2 | 5/2007 | Zelek et al. | |
| 7,917,379 B1* | 3/2011 | Burkhardt | G06Q 50/28 705/7.12 |
| 7,949,624 B2 | 5/2011 | Kelly et al. | |
| 8,078,489 B1* | 12/2011 | Marsten | G06Q 10/04 705/7.25 |
| 8,117,052 B2 | 2/2012 | Chung et al. | |
| 8,412,551 B2* | 4/2013 | Feng | G06Q 10/06314 706/12 |
| 8,429,035 B1* | 4/2013 | Kamath | G06Q 10/06 705/28 |
| 8,639,549 B2 | 1/2014 | Pathak et al. | |
| 8,655,705 B2 | 2/2014 | Riepshoff et al. | |
| 9,031,798 B2 | 5/2015 | Kalagnanam et al. | |
| 9,224,110 B2 | 12/2015 | Moorkanat et al. | |
| 9,805,402 B1* | 10/2017 | Maurer | G06Q 10/087 |
| 10,235,642 B2 | 3/2019 | Kattepur et al. | |
| 10,380,524 B1* | 8/2019 | Raymond | G06Q 10/06315 |
| 11,074,601 B2 | 7/2021 | Subramanian et al. | |
| 11,093,884 B2 | 8/2021 | Devarakonda et al. | |
| 11,328,229 B1* | 5/2022 | R | G06Q 10/06315 |
| 2003/0040954 A1* | 2/2003 | Zelek | G06Q 30/0201 705/7.29 |
| 2003/0065415 A1* | 4/2003 | Hegde | G06Q 10/0875 700/100 |
| 2005/0137959 A1* | 6/2005 | Yan | G06Q 20/102 705/40 |
| 2005/0171826 A1* | 8/2005 | Denton | G06Q 10/063 705/7.11 |
| 2006/0089864 A1* | 4/2006 | Feng | G06Q 10/04 705/7.24 |
| 2006/0224534 A1* | 10/2006 | Hartman | G05B 17/02 706/15 |
| 2007/0203810 A1* | 8/2007 | Grichnik | G06Q 10/087 705/28 |
| 2008/0097731 A1* | 4/2008 | Lanes | G06Q 10/087 703/2 |
| 2008/0221960 A1* | 9/2008 | Moorkanat | G06Q 10/04 705/7.25 |
| 2008/0243570 A1* | 10/2008 | Moorkanat | G06Q 10/06 705/7.12 |
| 2009/0094087 A1* | 4/2009 | Chung | G06Q 10/08 705/7.11 |
| 2009/0216699 A1* | 8/2009 | Kelly | G06N 5/02 706/46 |
| 2010/0332273 A1* | 12/2010 | Balasubramanian | G06Q 50/28 705/332 |
| 2011/0077994 A1* | 3/2011 | Segev | G06Q 10/06 703/2 |
| 2011/0173042 A1* | 7/2011 | Riepshoff | G06Q 10/087 705/28 |
| 2011/0270646 A1* | 11/2011 | Prasanna | G06Q 10/00 706/46 |
| 2012/0010919 A1* | 1/2012 | Aswal | G06Q 10/06315 706/52 |
| 2012/0035984 A1* | 2/2012 | Gorur Narayana Srinivasa | G06Q 10/06375 705/7.35 |
| 2012/0084106 A1* | 4/2012 | Pathak | G06Q 10/00 705/7.11 |
| 2012/0158398 A1* | 6/2012 | Denero | G06N 7/01 704/E11.001 |
| 2013/0018517 A1* | 1/2013 | Kalagnanam | H02J 3/00 700/291 |
| 2013/0159045 A1* | 6/2013 | Ettl | G06Q 10/087 705/7.25 |
| 2013/0238546 A1* | 9/2013 | Kalagnanam | G06F 17/11 706/52 |
| 2015/0324740 A1* | 11/2015 | Shao | G06Q 10/0633 705/331 |
| 2015/0370251 A1* | 12/2015 | Siegel | G05D 1/0684 701/2 |
| 2017/0185933 A1* | 6/2017 | Adulyasak | G06Q 10/087 |
| 2017/0352003 A1* | 12/2017 | Bertoli | G06Q 10/04 |
| 2018/0270121 A1* | 9/2018 | Stringfellow | G06Q 10/047 |
| 2019/0049975 A1* | 2/2019 | Kattepur | G05D 1/0217 |
| 2019/0244230 A1* | 8/2019 | Subramanian | G06N 3/08 |
| 2020/0175441 A1* | 6/2020 | Sukhobokov | G06Q 10/06313 |
| 2020/0210947 A1* | 7/2020 | Devarakonda | G06Q 10/087 |
| 2021/0390498 A1* | 12/2021 | Ohlsson | G06N 20/00 |

FOREIGN PATENT DOCUMENTS

| | | | | |
|---|---|---|---|---|
| EP | 1677237 A1 * | 7/2006 | | G06Q 10/04 |
| WO | WO2010103543 | 9/2010 | | |
| WO | WO-2010103543 A1 * | 9/2010 | | G06Q 10/04 |
| WO | WO-2010151668 A1 * | 12/2010 | | G06Q 10/08 |

OTHER PUBLICATIONS

Bidhandi, Hadi Mohammadi, et al. "Development of a new approach for deterministic supply chain network design." European Journal of Operational Research 198.1 (2009): 121-128. (Year: 2009).*

Brunaud, Braulio, Maria Paz Ochoa, and Ignacio E. Grossmann. "Product decomposition strategy for optimization of supply chain planning." Frontiers of Engineering Management 5.4 (2018): 466-478. (Year: 2018).*

Peidro, David, et al. "A fuzzy linear programming based approach for tactical supply chain planning in an uncertainty environment." European Journal of Operational Research 205.1 (201 0): 65-80. (Year: 2010).

Poncharoen, Pupong, et al. "Multi-matrix real-coded genetic algorithm for minimising total costs in logistics chain hetwork." International Journal of Intelligent Technology 3.1 (2007). (Year: 2007).

Brunaud, Braulio, et al. "Product decomposition strategy for optimization of supply chain planning." Frontiers of Engineering Management 5.4 (2018): 466-478. (Year: 2018).

Chen, Peter, et al. "Lagrangean-based techniques for the supply chain management of flexible process networks." Computers & Chemical Engineering 32.11 (2008): 2505-2528. (Year: 2008).

* cited by examiner

| TestSet | NUMBER OF CONSTRAINTS 1220 | ORIGINAL PROBLEM (NUMBER OF COMPONENTS) 1222 | LARGEST PROBLEM SIZE (ORIGINAL) 1224 | IMAGE BASED DECOMPOSITION (NUMBER OF COMPONENTS) 1226 | LARGEST PROBLEM SIZE (DECOMPOSED) 1228 | % COMPLICATING CONSTRAINTS 1230 |
|---|---|---|---|---|---|---|
| 1 | 1875349 | 29 | 99.9% | 888 | 49.0% | 8.00% |
| 2 | 1875289 | 421 | 64.0% | 2719 | 32.0% | 7.00% |
| 3 | 1236998 | 395 | 55.0% | 5317 | 10.0% | 5.00% |
| 4 | 486517 | 4242 | 98.0% | 4789 | 62.0% | 3.00% |

COMPARISON TABLE: IMAGE BASED DECOMPOSITION VS EXISTING LpOpt

FIG. 12B

| DATASET: 1540 1310 | 1312 | 1314 | 1316 | 1318 | 1320 | 1322 |
|---|---|---|---|---|---|---|
| df_nm | NUMBER OF CONNECTED COMPONENTS | #FIRST SPLIT SIZE (VARS) | #REST SPLIT SIZE (VARS) | REST SPLIT IN% | REMAINING EDGES | REMOVED EDGES |
| ORIGINAL DF | 962 | 306009 | 65269 | 82.00% | 702637 | 0 |
| AFTER REMOVING All_Vars | 77719 | 470 | 158992 | 0.00% | 165448 | 537189 |
| AFTER REMOVING XBAL | 7846 | 151787 | 47807 | 76.00% | 366806 | 335831 |
| AFTER REMOVING OP | 10345 | 5202 | 333305 | 2.00% | 533912 | 168725 |
| AFTER REMOVING F | 2444 | 282420 | 88858 | 76.00% | 679015 | 23622 |
| AFTER REMOVING CAP | 962 | 303105 | 65269 | 82.00% | 699733 | 2904 |
| AFTER REMOVING AMT | 923 | 303527 | 65002 | 82.00% | 699888 | 2749 |
| AFTER REMOVING B | 1112 | 305085 | 65359 | 82.00% | 700969 | 1668 |
| AFTER REMOVING SBAL | 962 | 305366 | 65053 | 82.00% | 700972 | 1665 |
| AFTER REMOVING XBD | 962 | 306003 | 65260 | 82.00% | 702612 | 25 |

FIG. 13

| DATASET: 1859 | | | | | | |
|---|---|---|---|---|---|---|
| df_nm | NUMBER OF CONNECTED COMPONENTS | #FIRST SPLIT SIZE (VARS) | #REST SPLIT SIZE (VARS) | REST SPLIT IN% | REMAINING EDGES | REMOVED EDGES |
| ORIGINAL DF | 11852 | 3809547 | 2094760 | 65.00% | 12004559 | 0 |
| AFTER REMOVING All_Vars | 1400331 | 30430 | 2634808 | 1.00% | 3059926 | 8944633 |
| AFTER REMOVING XBAL | 47672 | 1773657 | 1040417 | 63.00% | 5985432 | 6019127 |
| AFTER REMOVING OP | 163595 | 33137 | 5871129 | 1.00% | 10173386 | 1831173 |
| AFTER REMOVING F | 77675 | 3195798 | 2708509 | 54.00% | 11274740 | 729819 |
| AFTER REMOVING ST | 13859 | 3791976 | 2112331 | 64.00% | 11827389 | 177170 |
| AFTER REMOVING AMT | 9575 | 3735330 | 2062144 | 64.00% | 11897726 | 106833 |
| AFTER REMOVING B | 14591 | 3780555 | 2085319 | 64.00% | 11927693 | 76866 |
| AFTER REMOVING CAP | 11852 | 3806173 | 2094738 | 65.00% | 12001163 | 3396 |
| AFTER REMOVING SBAL | 11852 | 3809501 | 2094685 | 65.00% | 12004327 | 232 |
| AFTER REMOVING XBD | 11852 | 3809539 | 2094756 | 65.00% | 12004542 | 17 |

FIG. 14

| | DATASET: 12289 1310 | 1312 | 1314 | 1316 | 1318 | 1320 | 1322 |
|---|---|---|---|---|---|---|---|
| | df_nm | NUMBER OF CONNECTED COMPONENTS | #FIRST SPLIT SIZE (VARS) | #REST SPLIT SIZE (VARS) | REST SPLIT IN% | REMAINING EDGES | REMOVED EDGES |
| 1330 | ORIGINAL DF | 421 | 1875289 | 1051163 | 64.00% | 6414617 | 0 |
| 1332 | AFTER REMOVING All_Vars | 75687 | 10812 | 732797 | 1.00% | 1479373 | 4935244 |
| 1502 | AFTER REMOVING CR | 11449 | 880977 | 554567 | 61.00% | 3432801 | 2981816 |
| 1334 | AFTER REMOVING XBAL | 28143 | 1515810 | 896057 | 63.00% | 5395821 | 1018796 |
| 1336 | AFTER REMOVING OP | 2719 | 901596 | 1954724 | 32.00% | 6004541 | 410076 |
| 1342 | AFTER REMOVING AMT | 1042 | 1822909 | 1023461 | 64.00% | 6027806 | 386811 |
| 1302 | AFTER REMOVING ST | 2908 | 1850362 | 1076037 | 63.00% | 6322561 | 92056 |
| 1346 | AFTER REMOVING SBAL | 421 | 1868880 | 1039388 | 64.00% | 6378656 | 35961 |
| 1504 | AFTER REMOVING XDMD | 421 | 1871575 | 1051163 | 64.00% | 6410903 | 3714 |
| 1340 | AFTER REMOVING CAP | 421 | 1874507 | 1049448 | 64.00% | 6412120 | 2497 |
| 1348 | AFTER REMOVING XBD | 421 | 1874709 | 1050898 | 64.00% | 6412943 | 1674 |
| 1506 | AFTER REMOVING XCAP | 421 | 1875244 | 1049565 | 64.00% | 6412974 | 1643 |
| 1508 | AFTER REMOVING SPRP | 421 | 1875197 | 1051163 | 64.00% | 6414525 | 92 |
| 1510 | AFTER REMOVING XPRP | 421 | 1875197 | 1051163 | 64.00% | 6414525 | 92 |
| 1512 | AFTER REMOVING WBAL | 421 | 1875278 | 1051158 | 64.00% | 6414601 | 16 |

FIG. 15

DATASET NAME: 9561
SIZE: 4112

| MATRIX | NUMBER OF CONNECTED COMPONENTS 1312 | #FIRST SPLIT SIZE (VARS) 1314 | #REST SPLIT SIZE (VARS) 1316 | FIRST SPLIT IN% 1622 | REMAINING EDGES 1320 | REMOVED EDGES 1322 |
|---|---|---|---|---|---|---|
| matrix.in_dataset_orig | 1 | 870581 | 0 | 100.00% | 2245642 | 0 |
| matrix.in_removed_contour_0 | 44789 | 2739 | 650261 | 0.00% | 1257478 | 988164 |
| matrix.in_removed_contour_1 | 1 | 870581 | 0 | 100.00% | 2244380 | 1262 |
| matrix.in_removed_contour_2 | 1 | 870581 | 0 | 100.00% | 2244596 | 1046 |
| matrix.in_removed_contour_3 | 1 | 870581 | 0 | 100.00% | 2244765 | 877 |
| matrix.in_removed_contour_4 | 1 | 870581 | 0 | 100.00% | 2244825 | 817 |

FIG. 16

DATASET NAME: 714110

SIZE: 4536

| MATRIX | NUMBER OF CONNECTED COMPONENTS | #FIRST SPLIT SIZE (VARS) | #REST SPLIT SIZE (VARS) | FIRST SPLIT IN% | REMAINING EDGES | REMOVED EDGES |
|---|---|---|---|---|---|---|
| matrix.in_removed_contour_0 | 142 | 51907 | 143 | 100.00% | 100870 | 10792 |
| matrix.in_removed_contour_1 | 254 | 49570 | 3262 | 94.00% | 109535 | 2127 |
| matrix.in_removed_contour_2 | 8 | 52837 | 7 | 100.00% | 109304 | 2358 |
| matrix.in_removed_contour_3 | 8 | 52837 | 7 | 100.00% | 110815 | 847 |
| matrix.in_removed_contour_4 | 29 | 52730 | 79 | 100.00% | 110593 | 1069 |

FIG. 17

| DATASET NAME: 9930 | | | | | | |
|---|---|---|---|---|---|---|
| SIZE: 445696 | | | | | | |
| | 1312 | 1314 | 1316 | 1622 | 1320 | 1322 |
| MATRIX | NUMBER OF CONNECTED COMPONENTS | #FIRST SPLIT SIZE (VARS) | #REST SPLIT SIZE (VARS) | FIRST SPLIT IN% | REMAINING EDGES | REMOVED EDGES |
| matrix.in_removed_contour_0 | 172 | 777 | 7357 | 10.00% | 13850 | 2582 |
| matrix.in_removed_contour_1 | 25 | 7721 | 147 | 98.00% | 15137 | 1295 |
| matrix.in_removed_contour_2 | 11 | 7991 | 524 | 94.00% | 15638 | 794 |
| matrix.in_removed_contour_3 | 37 | 8138 | 375 | 96.00% | 15767 | 665 |
| matrix.in_removed_contour_4 | 19 | 8282 | 246 | 97.00% | 15899 | 533 |

FIG. 18

IMAGE-BASED DECOMPOSITION FOR FAST ITERATIVE SOLVE OF COMPLEX LINEAR PROBLEMS

CROSS-REFERENCE TO RELATED APPLICATIONS

This application is a continuation U.S. patent application Ser. No. 17/745,305, filed on May 16, 2022 entitled "Image-Based Decomposition for Fast Iterative Solve of Complex Linear Problems" which is a continuation of U.S. patent application Ser. No. 16/886,684, filed on May 28, 2020 entitled "Image-Based Decomposition for Fast Iterative Solve of Complex Linear Problems," now U.S. Pat. No. 11,334,827 which claims the benefit under 35 U.S.C. § 119(e) to U.S. Provisional Application No. 62/895,866, filed Sep. 4, 2019, entitled "Image-Based Decomposition for Fast Iterative Solve of Complex Linear Problems" and 62/856,360, filed Jun. 3, 2019, entitled "Image Based Decomposition for Fast Iterative Solve of Complex Linear Problems". U.S. patent application Ser. No. 17/745,305, U.S. Pat. No. 11,334,827, and U.S. Provisional Application Nos. 62/895,866 and 62/856,360 are assigned to the assignee of the present application.

TECHNICAL FIELD

The present disclosure relates generally to supply chain planning and specifically to systems and methods of image-based decomposition solving of linear programming supply chain planning problems.

BACKGROUND

During supply chain planning, a supply chain plan may be generated by modeling and solving a supply chain planning problem as a linear programming (LP) problem. Although this approach may generate optimal solutions, it is overly time consuming, resource intensive, and often requires simplifying constraints or objectives to finish the solve within pre-specified batch solve windows. Speeding up solve times can sometimes be accomplished by decomposing a monolithic LP into multiple smaller problems, which are then solved individually. Unfortunately, monolithic LP problems are generally not amenable to standard decomposition techniques. The inability to decompose monolithic LP problems to improve solving speed of supply chain planning problems is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 12A-12B illustrate a chart and a table comparing the largest subproblem size of the original LP optimization problem and the largest subproblem size of the image-based decomposition, in accordance with an embodiment; and FIGS. 13-18 illustrate transformations of exemplary datasets according to the method of image-based decomposition of FIG. 7, in accordance with an embodiment.

DETAILED DESCRIPTION

Figure 1:
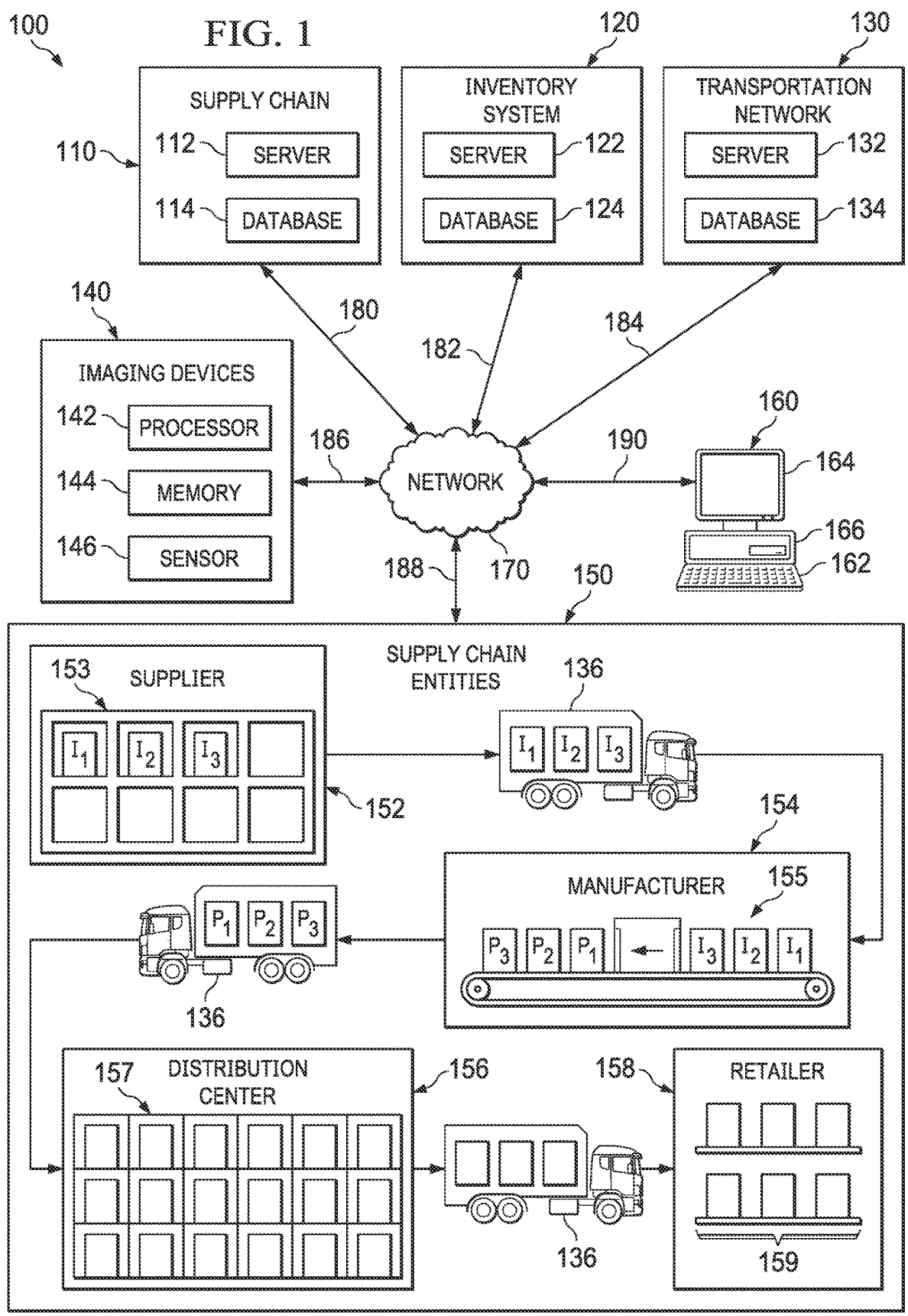
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, in accordance with a first embodiment. Supply chain network 100 comprises supply chain planner 110, inventory system 120, transportation network 130, one or more imaging devices 140, one or more supply chain entities 150, computer 160, network 170, and communication links 180-190. Although a single supply chain planner 110, a single inventory system 120, a single transportation network 130, one or more imaging devices 140, one or more supply chain entities 150, a single computer 160, and a single network 170 are shown and described, embodiments contemplate any number of supply chain planners, inventory systems, transportation networks, imaging devices, supply chain entities, computers, or networks, according to particular needs.

In one embodiment, supply chain planner 110 comprises server 112 and database 114. Server 112 comprises one or more modules that model, decompose, and solve supply chain planning problems using image-based processing techniques to decompose monolithic LP supply chain planning problems into independent subproblems. Supply chain planner 110 translates image-based insights into LP insights to rapidly generate a supply chain plan. Although standard decomposition techniques may speed up the solve time for optimization problems, decomposition of an LP problem may depend on prior knowledge of the structure and functional knowledge of the problem being optimized. In cases where functional insights are not available or may not be well-defined or may be too complex, a standard decomposition technique cannot be applied, leading to relatively longer runtimes. As described in more detail below, supply chain planner 110 decomposes a large supply chain planning problem into more than one smaller supply chain planning problems by converting the formulation of the LP problem (such as, for example, one or more matrices) into one or more images, identifying clusters and contours that indicate subproblem components, and solving the subproblems sequentially, or in parallel, to generate a globally-optimal solution.

Inventory system 120 comprises server 122 and database 124. Server 122 of inventory system 120 is configured to receive and transmit product data 216 (see FIG. 2) (including, for example, item identifiers, pricing data, and attribute data), inventory data 220 (including, for example, inventory levels), and other like data about one or more items at one or more locations in supply chain network 100. Server 122 stores and retrieves data about the one or more items from database 124 or from one or more locations in supply chain network 100.

Transportation network 130 comprises server 132 and database 134. According to embodiments, transportation network 130 directs one or more transportation vehicles 136 to ship one or more items between one or more supply chain entities 150, based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein. One or more transportation vehicles 136 comprise, for example, any number of trucks, cars, vans, boats, airplanes, unmanned aerial vehicles (UAVs), cranes, robotic machinery, or the like. One or more transportation vehicles 136 may comprise radio, satellite, or other communication that communicates location information (such as, for example, geographic coordinates, distance from a location, global positioning satellite (GPS) information, or the like) with supply chain planner 110, inventory system 120, transportation network 130, one or more imaging devices 140, and/or one or more supply chain entities 150 to identify the location of one or more transportation vehicles 136 and the location of an item of any inventory or shipment located on one or more transportation vehicles 136.

One or more imaging devices 140 comprise one or more processors 142, memory 144, one or more sensors 146, and may include any suitable input device, output device, fixed or removable computer-readable storage media, or the like. According to embodiments, one or more imaging devices 140 comprise an electronic device that receives data from one or more sensors 146. One or more sensors 146 of one or more imaging devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases.

In addition, or as an alternative, one or more sensors 146 may comprise a radio receiver and/or transmitter configured to read from and/or write to an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like device that encodes identifying information. One or more imaging devices 140 may generate a mapping of one or more items in supply chain network 100 by scanning an identifier associated with an item and identifying the item based, at least in part, on the scan. This may include, for example, a stationary scanner located at one or more supply chain entities 150 that scans items as the items pass near the scanner. As explained in more detail below, supply chain planner 110, inventory system 120, transportation network 130, and one or more imaging devices 140 may use the mapping of an item to locate the item in supply chain network 100. The location of the item may be used to coordinate the storage and transportation of items in supply chain network 100 according to one or more plans generated by supply chain planner 110 and/or a reallocation of materials or capacity. Plans may comprise one or more of a supply chain plan, production plan, distribution plan, and the like.

Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with one or more of supply chain planner 110, inventory system 120, transportation network 130, one or more imaging devices 140, one or more supply chain entities 150, computer 160, and/or network 170 using one or more communication links 180-190.

As shown in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. Computer 160 may include any suitable input device 162, such as a keypad, mouse, touch screen, microphone, or other device to input information. Output device 164 may convey information associated with the operation of supply chain network 100, including digital or analog data, visual information, or audio information.

Computer 160 may include fixed or removable computer-readable storage media, including a non-transitory computer-readable medium, magnetic computer disks, flash drives, CD-ROM, in-memory device or other suitable media to receive output from and provide input to supply chain network 100. Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein. By way of example only and not by way of limitation, further embodiments include computer 160 comprising any number of one or more processing units, including, for example, one or more graphical processing units (GPUs), programmed to create, manipulate, render for display, analyze, decompose, or otherwise process one or more graphs, networks, digraphs, multigraphs, images, or other data structures, as described in further detail below.

Supply chain planner 110, inventory system 120, transportation network 130, one or more imaging devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations local to, or remote from, supply chain planner 110, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including producing items), and/or one or more related tasks within supply chain network 100.

One or more supply chain entities 150 may represent one or more suppliers 152, manufacturers 154, distribution centers 156, and retailers 158 of one or more supply chain networks 100, including one or more enterprises. One or more suppliers 152 may be any suitable entity that offers to sell or otherwise provides one or more components to one or more manufacturers 154. One or more suppliers 152 may, for example, receive a product from a first supply chain entity in supply chain network 100 and provide the product to another supply chain entity. One or more suppliers 152 may comprise automated distribution systems 153 that automatically transport products to one or more manufacturers 154 based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more manufacturers 154 may be any suitable entity that manufactures at least one product. One or more manufacturers 154 may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, an item that needs further processing, or any other item. One or more manufacturers 154 may, for example, produce and sell a product to one or more suppliers 152, another one or more manufacturers 154, one or more distribution centers 156, one or more retailers 158, or any other suitable customer or one or more supply chain entities 150. One or more manufacturers 154 may comprise automated robotic production machinery 155 that produce products based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more distribution centers 156 may be any suitable entity that offers to sell or otherwise distributes at least one product to one or more retailers 158, customers, or any suitable one or more supply chain entities 150. One or more distribution centers 156 may, for example, receive a product from a first supply chain entity in supply chain network 100 and store and transport the product for a second supply chain entity. One or more distribution centers 156 may comprise automated warehousing systems 157 that automatically transport an item to, remove an item from, or place an item into inventory of one or more retailers 158, customers, or one or more supply chain entities 150 based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on the number of items currently in transit in transportation network 130, a supply chain plan, including a supply chain master plan, the number of items currently in stock at one or more supply chain entities 150, a forecasted demand, a supply chain disruption, a material or capacity reallocation, current and projected inventory levels at one or more stocking locations, and/or one or more additional factors described herein.

Although one or more suppliers 152, manufacturers 154, distribution centers 156, and retailers 158 are shown and described as separate and distinct entities, the same entity may simultaneously act as any one or more suppliers 152, manufacturers 154, distribution centers 156, and retailers 158. For example, one or more manufacturers 154 acting as a manufacturer could produce a product, and the same entity could act as one or more suppliers 158 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 182, which may be any wireline, wireless, or other link suitable to support data communications between inventory system 120 and network 170 during operation of supply chain network 100. Transportation network 130 may be coupled with network 170 using communication link 184, which may be any wireline, wireless, or other link suitable to support data communications between transportation network 130 and network 170 during operation of supply chain network 100. One or more imaging devices 140 are coupled with network 170 using communication link 186, which may be any wireline, wireless, or other link suitable to support data communications between one or more imaging devices 140 and network 170 during operation of distributed supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. Computer 160 may be coupled with network 170 using communication link 190, which may be any wireline, wireless, or other link suitable to support data communications between computer 160 and network 170 during operation of supply chain network 100.

Although communication links 180-190 are shown as generally coupling supply chain planner 110, inventory system 120, transportation network 130, one or more imaging devices 140, one or more supply chain entities 150, and computer 160 to network 170, each of supply chain planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and computer 160. For example, data may be maintained local to, or external of, supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may generate a supply chain plan, including a supply chain master plan. Furthermore, one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products by manufacturing equipment, proportional or alternative sourcing of one or more supply chain entities 150, and the configuration and quantity of packaging and shipping of items based on the number of items currently in transit in transportation network 130, a supply chain plan, including a supply chain master plan, a solution to a supply chain planning problem, the number of items currently in stock at one or more supply chain entities 150, a forecasted demand, a supply chain disruption, a material or capacity reallocation, current and projected inventory levels at one or more stocking locations, and/or one or more additional factors described herein. For example, and as discussed below in FIG. 2, the methods described herein may include computers 160 receiving product data 216 from automated machinery having at least one sensor and product data 216 corresponding to an item detected by the automated machinery. Received product data 216 may include an image of the item, an identifier, as disclosed above, and/or product information associated with the item, including, for example, dimensions, texture, estimated weight, and the like. Computers 160 may also receive, from one or more sensors 146 of one or more imaging devices 140, a current location of the identified item.

According to embodiments, the methods may further include computers 160 looking up received product data 216 in a database 114 to identify the item corresponding to product data 216 received from automated machinery. Based on the identification of the item, computers 160 may also identify (or alternatively generate) a first mapping in database 114, where the first mapping is associated with the current location of the identified item. Computers 160 may also identify a second mapping in database 114, where the second mapping is associated with a past location of the identified item. Computers 160 may also compare the first mapping and the second mapping to determine when the current location of the identified item in the first mapping is different than the past location of the identified item in the second mapping. Computers 160 may send instructions to the automated machinery based, at least in part, on one or more differences between the first mapping and the second mapping such as, for example, to locate items to add to, or remove from, an inventory or shipment of one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more detected supply chain constraints.

Figure 2:
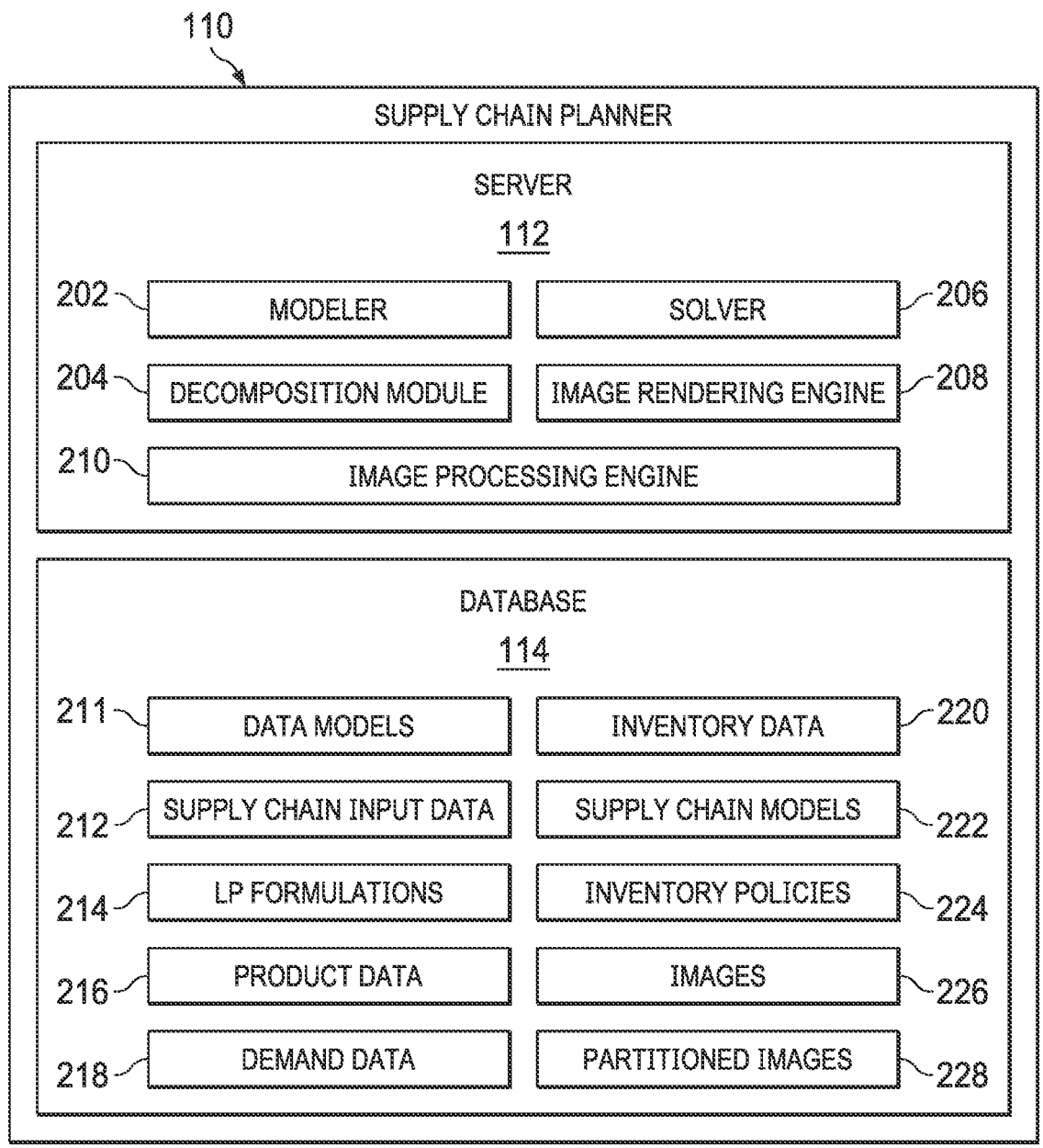
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As disclosed above, supply chain planner 110 comprises server 112 and database 114. Although supply chain planner 110 is shown as comprising a single server 112 and a single database 114, embodiments contemplate any suitable number of servers or databases internal to, or externally coupled with, supply chain planner 110.

Server 112 of supply chain planner 110 comprises modeler 202, decomposition module 204, and solver 206. Although server 112 is shown and described as comprising a single modeler 202, a single decomposition module 204, and a single solver 206, embodiments contemplate any suitable number or combination of these located at one or more locations, local to, or remote from supply chain planner 110, such as on multiple servers or computers at any location in supply chain network 100.

Database 114 of supply chain planner 110 may comprise one or more databases or other data storage arrangement at one or more locations, local to, or remote from, server 112. Database 114 comprises, for example, data models, 210 supply chain input data 212, LP formulations 214, product data 216, demand data 218, inventory data 220, supply chain models 222, inventory policies 224, images 226, and partitioned images 228. Although database 114 is shown and described as comprising data models 210, supply chain input data 212, LP formulations 214, product data 216, demand data 218, inventory data 220, supply chain models 222, inventory policies 224, images 226, and partitioned images 228, embodiments contemplate any suitable number or combination of these, located at one or more locations, local to, or remote from, supply chain planner 110 according to particular needs.

Modeler 202 may model one or more supply chain planning problems, such a, for example, an LP supply chain planning problem of supply chain network 100. According to embodiments, modeler 202 of server 112 identifies resources, operations, buffers, and pathways, and maps supply chain network 100 using supply chain data models 210, as described in more detail below. For example, modeler 202 of server 112 formulates a supply chain planning problem, including a multi-period supply chain planning problem, of supply chain network 100 as a hierarchical multi-objective LP problem. Embodiments contemplate modeler 202 formulating other suitable mathematical and graphical formulations of supply chain planning problems, according to particular needs.

Decomposition module 204 receives LP formulations 214 from modeler 202, transmits LP formulations 214 to solver 206, and receives solutions to LP formulations from solver 206. In addition, or as an alternative, decomposition module 204 transmits LP formulations 214 to, and receives LP formulations 214 from, image rendering engine 208.

Solver 206 of server 112 comprises one or more optimization, heuristic, or mathematical solvers that utilize LP optimization, decomposition techniques, or masterless iteration to generate a solution to the LP supply chain planning problem. As described in further detail below, solver 206 calculates LP solutions to subproblems representing the decomposed LP supply chain planning problem to generate globally-optimal LP solutions. As described in further detail below, the supply chain planning problem, such as, for example, a supply chain master planning problem is divided into two or more submatrices, which are then solved using a CPLEX solver, which are solved according to a combined objective. The solution may then be evaluated according to one or more stopping criteria, which when the one or more stopping criteria are not met, supply chain planner 110 performs masterless iteration to generate two or more new supply chain planning problems represented by the two or more submatrices. When the one or more stopping criteria are met, the solution comprises an optimal solution, which after bound fixing, is used to generate a further LP matrix. By way of example only and not by way of limitation, stopping criteria comprise one or more of an image-based interpretation of dual variables, infeasibility in capacity or material less than, equal to, and/or greater than a particular value, percentage, or other threshold.

Decomposing a monolithic LP into multiple smaller problems and solving them individually may result in faster solves. Image rendering engine 208 receives LP formulations 214, and image processing engine 210 generates images 226 representing multiple smaller problems of the LP supply chain planning problem, or subproblems. According to embodiments, image rendering engine 208 transforms LP formulations 214 to one or more images 226 and transmits images 226 to image processing engine 210. After identifying clusters and contours, image processing engine 210 transmits one or more images 226 representing the subproblems to image rendering engine 208, which transforms the received images 226 to LP formulations 214, such as, for example, LP constraint-variable matrices, as described in further detail below.

As an example only and not by way of limitation, database 114 stores data models 210, which represent the flow of materials through one or more supply chain entities 150 of supply chain network 100. Modeler 202 of supply chain planner 110 may model the flow of materials through one or more supply chain entities 150 of supply chain network 100 as one or more data models 210 comprising, for example, a network of nodes and edges. Material storage and/or transition units may be modeled as nodes, which may be referred to as buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. According to some embodiments, the quantity of consumption and production is indicated as a weight on an edge. A planning horizon for data models 210 may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100. Although the LP supply chain planning problems are described as comprising supply chain graphs, embodiments contemplate representing LP supply chain planning problems using other graphical models to represent LP supply chain planning problems, according to particular needs.

Supply chain input data 212 may comprise various decision variables, business constraints, goals, and objectives of one or more supply chain entities 150. According to some embodiments, supply chain input data 212 may comprise hierarchical objectives specified by, for example, business rules, master planning requirements, scheduling constraints, and discrete constraints, including, for example, sequence-dependent setup times, lot-sizing, storage, shelf life, and the like.

LP formulations 214 of database 114 include single- or multi-objective LP supply chain master planning problems, matrix formulations of the LP supply chain master planning problem, and decomposed subproblems as well as any associated data and mappings used to formulate or solve an LP problem, such as, for example, LP constraint-variable matrices, complicating constraints, decomposed subproblems, globally-optimal LP solutions, objectives, objective hierarchies, and fixed variables. According to embodiments, LP formulations 214 comprise mathematical objective functions that represent business objectives, such as, for example, minimizing the quantity of unmet demand, minimizing usage of alternate resources (e.g. maximizing usage of primary resources), planning items as just-in-time (JIT) as possible (e.g. minimizing the amount of carried-over items), and the like. LP formulations 210 additionally comprise mathematical constraints representing limitations to capacity, materials, lead times, and the like; and minimum and maximum values for decision variables representing lower and upper bounds. By way of example only and not of limitation, the lower and upper bounds for the capacity of a machine may be set at zero hours and ten hours, respectively. In this example, zero hours comprises the lower bound (because a machine cannot be used for a negative period of time) and ten hours represents a maximum number of hours the machine may be used in a day.

LP formulations 214 may comprise one or more LP constraint-variable matrices. According to embodiments, an LP constraint-variable matrix is a sparse matrix, wherein a first direction represents constraints, a second direction represents variables, and each element comprises a coefficient of the variable that intersects the constraint. By way of example only and not by way of limitation, an LP constraint-variable matrix is a sparse matrix, wherein rows represent constraints, columns represent variables, and each element comprises a coefficient of the variable represented by its column for the constraint represented by its row. According to embodiments, the supply chain planner decomposes LP supply chain planning problems into subproblems by decomposing an LP constraint variable matrix into one or more submatrices, which may also be formulated as LP constraint-variable matrices. In addition, an LP constraint-variable matrices may comprise one or more additional rows or columns in the same matrix, one or more other matrices, one or more submatrices, and the like, which may store other components associated with LP problem, such as, for example, objectives, right-hand side (RHS) values, lower/upper bounds, and the like, according to particular needs.

Although LP formulations 214 are described as representing LP supply chain planning problems as one or more LP constraint-variable matrices, embodiments contemplate representing LP supply chain planning problems using other suitable mathematical expressions, models, graphs, charts, or the like, according to particular needs.

Product data 216 of database 114 may comprise one or more data structures for identifying, classifying, and storing data associated with products, including, for example, a product identifier (such as a Stock Keeping Unit (SKU), Universal Product Code (UPC), or the like), product attributes, attribute values, sourcing information, and the like. Product data 216 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 218 of database 114 may comprise, for example, any data relating to past sales, past demand, purchase data, promotions, events, or the like of one or more supply chain entities 150. Demand data 218 may cover a time interval such as, for example, by the minute, hour, daily, weekly, monthly, quarterly, yearly, or any suitable time interval, including substantially in real time. According to embodiments, demand data 218 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 220 of database 114 may comprise any data relating to current or projected inventory quantities or states, order rules, or the like. For example, inventory data 220 may comprise the current level of inventory for each item at one or more stocking locations across supply chain network 100. In addition, inventory data 220 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 220 in database 114, which may be used by supply chain planner 110 to place orders, set inventory levels at one or more stocking points, initiate manufacturing of one or more items (or components of one or more items), or the like. In addition, or as an alternative, inventory data 220 may be updated by receiving current item quantities, mappings, or locations from inventory system 120, transportation network 130, one or more imaging devices 140, and/or one or more supply chain entities 150.

Supply chain models 222 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or as an alternative, supply chain models 222 may comprise characteristics that specify the supply chain structure in even more detail, including, for example, specifying the type of collaboration with the customer (e.g. Vendor-Managed Inventory (VMI)), the identity of stocking locations or suppliers from which items may be sourced, customer priorities, demand priorities, how products may be allocated, shipped, or paid for, by particular customers, and the destination stocking locations or one or more supply chain entities 150 where items may be transported. Differences of these characteristics may lead to different supply chain models 222.

Inventory policies 224 of database 114 may comprise any suitable inventory policy describing the reorder point and target quantity, or other inventory policy parameters that set rules for supply chain planner 110 to manage and reorder inventory. Inventory policies 224 may be based on target service level, demand, cost, fill rate, or the like. According to embodiment, inventory policies 224 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although a particular target service level and percentage is described, embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to supply or receive inventory to replace the depleted inventory.

Images 226 of database 114 are generated by image rendering engine 208 of supply chain planner 110, which employs a pixel-coloring logic to map a link between each pixel and one or more intersections of a row and column of the LP constraint-variable matrix. The links between pixels and one or more intersections are active when the link is associated with a non-zero coefficient; otherwise, the link is inactive. Image rendering engine 208 may render an image that represents inactive links as black pixels, and active links as white pixels. Although particular colors are described for particular categories of constraints, embodiments contemplate any color (including, for example, white, black or any tint, tone, or shade of white, black, or any other color) associated with pixels associated with any type of active or inactive links, according to particular needs. As described in further detail below, image rendering engine 208 removes contours from images 226 and generates one or more partitioned images 228, which each comprise one or more independent partitions of the supply chain planning problem identified from the one or more images 226 by image processing engine 210, but without connecting and complicating components which image rendering engine 208 removes.

Figure 3:
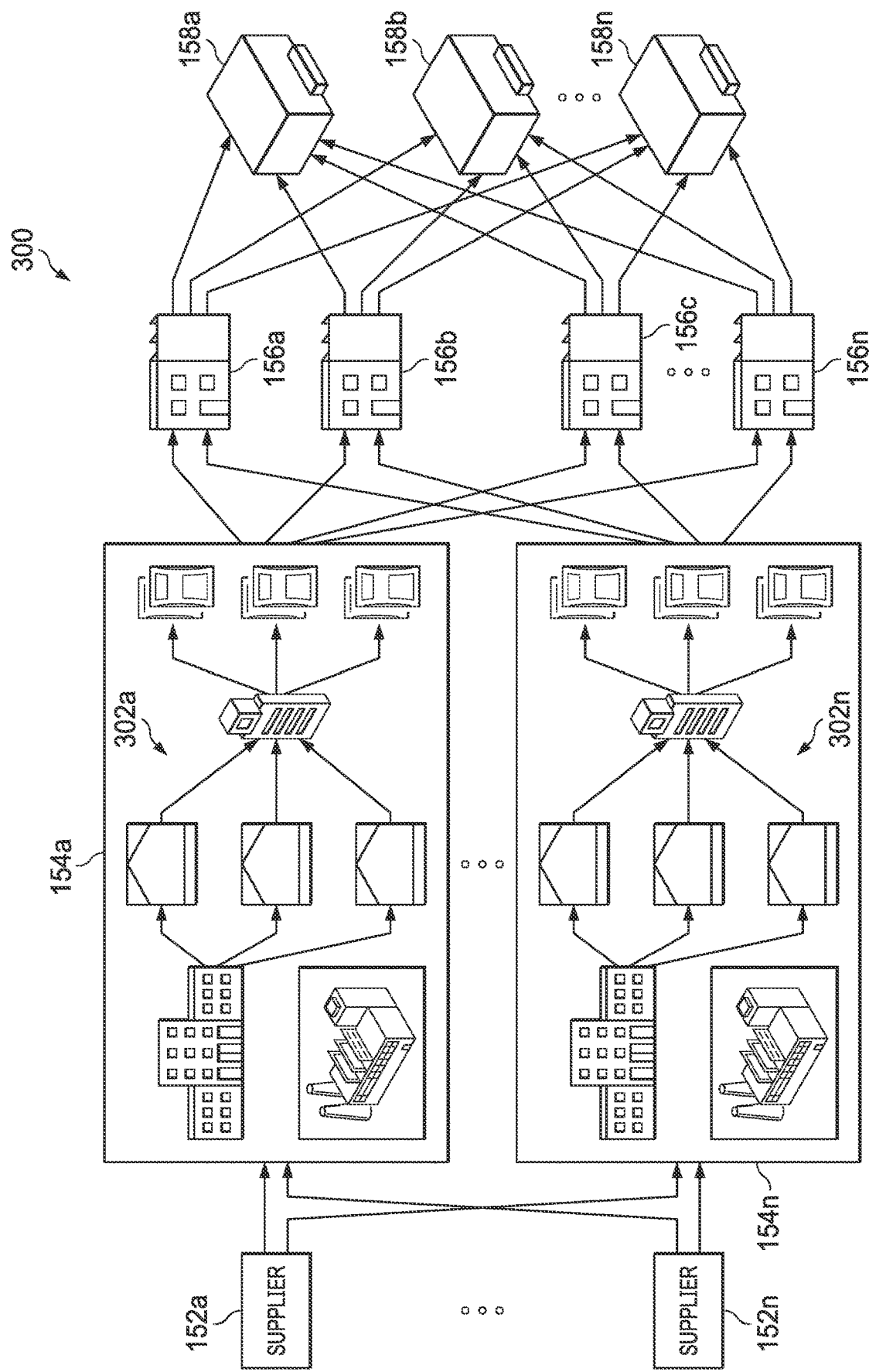
FIG. 3 illustrates an exemplary simplified supply chain network, in accordance with an embodiment.

FIG. 3 illustrates an exemplary simplified supply chain network 300, in accordance with an embodiment. Exemplary simplified supply chain network 300 comprises two or more suppliers 152a-152n, two or more manufacturers 154a-154n, four or more distribution centers 156a-156n, and three or more retailers 158a-158n. Two or more manufacturers 154a-154n receive items from two or more suppliers 152a-152n for production processes 302a-302n. Production processes 302a-302n comprise various operations for processing items, intermediate items, and finished goods, which may comprise one or more products transported to four or more distribution centers 156a-156n. Four or more distribution centers 156a-156n may transport products to three or more retailers 158a-158n. The flow of materials, items, and products among the two or more suppliers 152a-152n, two or more manufacturers 154a-154n, four or more distribution centers 156a-156n, and three or more retailers 158a-158n of exemplary simplified supply chain network 300 must meet demand requirements while being limited by constraints of capacity, materials, lead times, transportation, sourcing, and/or the like. Although a simplified exemplary supply chain network 300 is illustrated as comprising two or more suppliers 152a-152n, two or more manufacturers 154a-154n, four or more distribution centers 156a-156n, and three or more retailers 158a-158n, supply chain network 100 may comprise any number of one or more supply chain entities 150, according to particular needs. For example, supply chain network 100 often comprises multiple manufacturing plants located in different regions or countries. In addition, an item may be processed from many materials by many operations into a large number of different intermediate goods and/or finished items, where the different operations may have multiple constrained resources and multiple input items, each with their own lead, transportation, production, and cycle times. Additionally, materials and resources may flow upstream, downstream, or both, subject to material and capacity constraints and demand requirements.

Figure 4:
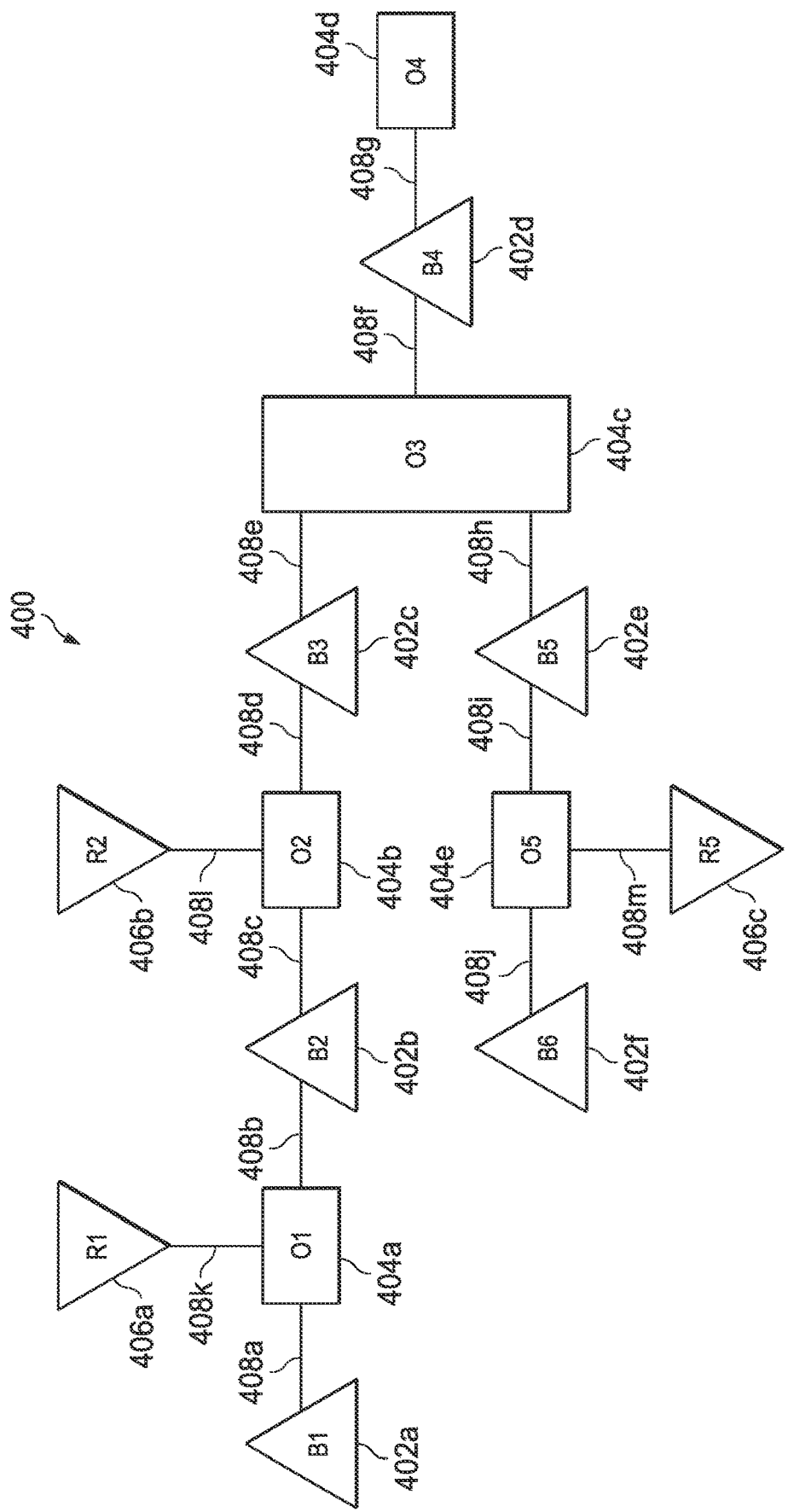
FIG. 4 illustrates an exemplary supply chain network chart, in accordance with an embodiment.

FIG. 4 illustrates an exemplary supply chain network chart 400, according to a further embodiment. As disclosed above, modeler 202 of supply chain planner 110 models supply chain network 100 as various material and capacity constraints and demand requirements. To create supply chain network chart 400, modeler 202 models supply chain network 100 to represent the flow of materials and resources between the supply chain entities in accordance with the constraints at each operation, buffer, and resource. Items flow from upstream nodes to downstream nodes to represent, for example, raw materials at upstream nodes being transformed into finished products at downstream nodes. However, flows may be bidirectional, and one or more items may flow from a downstream node to an upstream node, according to particular needs. Supply chain network chart 400 comprises six material buffers (B1-B6) 402a-402f storing items, five operations (O1-O5) 404a-404e for processing items, and three resource buffers (R1, R2, and R5) 406a-406c, which represent capacity limitations on each of the operations to which they are connected. Four operations (O1, O2, O4, O5) 404a-404d have a single item as input and a single item as output. A single operation (O3) 404c requires two items as input (i.e. materials or items stored at buffers B3 and B5) and produces a single item as output (materials or items stored at buffer B4).

By way of example only and not of limitation, supply chain network 100 represented by supply chain network chart 400 stores raw materials at the most upstream material buffers (B1 and B6) 402a and 402f. Material buffers (B1 and B6) 402a and 402f may receive raw materials as the initial input for a manufacturing process. Raw materials may comprise, for example, metal, fabric, adhesives, polymers, and other materials and compounds used during manufacturing. The flow of raw materials from materials buffers (B1 and B6) 402a and 402f is indicated by edges 408a and 408j, which identify operations (O1 and O5) 404a and 404e as a possible destination for the raw materials. Operations (O1 and O5) 404a and 404e may comprise production processes that receive raw materials and produce one or more intermediate items, which are then stored at material buffers (B2 and B5) 402*b* and 402*e* as indicated by edges 408*b* and 408*i*. Operations (O1 and O5) 404*a* and 404*e* are additionally coupled by edges 402*a* and 402*c* with resource buffers (R1 and R5) 406*a* and 406*c* to indicate that operations (O1 and O5) 404*a* and 404*e* require the resources from resource buffers (R1 and R5) 406*a* and 406*c* to process raw materials stored at the most upstream material buffers (B1 and B6) 402*a* and 402*f* into intermediate items stored at material buffers (B2 and B5) 402*b* and 402*e*. According to embodiments, resources represented by resource buffers (R1 and R5) 406*a* and 406*c* may include, for example, equipment or facilities for manufacturing, distribution, or transportation. Although resource buffers (R1 and R5) 406*a* and 406*c* are described as comprising equipment or facilities for manufacturing, distribution, or transportation, embodiments contemplate any number of one or more resource buffers representing other suitable resources utilized in supply chain operations, according to particular needs.

According to embodiments, edges 408*a*-408*m* represent limitations on supplying items or capacity to particular buffers including, but not limited to, for example, transportation limitations (such as, for example, cost, time, available transportation options) or outputs of various operations (such as, for example, different production processes, which produce different items, each of which may be represented by a different SKU, and which each may be stored at different buffers). For the exemplary supply chain network chart 400, transportation processes may transport, package, or ship intermediate and finished goods to one or more locations internal to or external of one or more supply chain entities 150 of supply chain network 100, including, for example, shipping directly to consumers, to regional or strategic distribution centers, or to the inventory of one or more supply chain entities 150, including, for example, to replenish a safety stock for one or more items in an inventory of one or more supply chain entities 150. Additionally, particular items and operations described herein comprise a simplified description for the purpose of illustration. Items may, for example, comprise different sizes, styles, or states of a same or a different item. Similarly, an operation may be any process or operation, including manufacturing, distribution, transportation, or any other suitable action of supply chain network 100. Although the limitation of the flow of items between nodes of supply chain network chart 400 is described as cost, timing, transportation, or production limitations, embodiments contemplate any suitable flow of items (or limitations of the flow of items) between any one or more different nodes of supply chain network chart 400, according to particular needs. In one embodiment, supply chain network chart 400 includes additional constraints, such as, for example, business constraints, operation constraints, and resource constraints, which facilitate one or more other planning rules. Although supply chain network chart 400 is shown and described as having a particular number and configuration of material buffers 402*a*-402*f*, operations 404*a*-404*e*, resource buffers 406*a*-406*c*, and edges 408*a*-408*m*, embodiments contemplate any number of buffers, resources, operations, and edges with any suitable flow between them, according to particular needs.

In addition or as an alternative, supply chain planner 110 may model a supply chain planning problem with time-buckets to provide efficient and almost-accurate modelling of various process lead times, material and capacity constraints, and demand requirements. To create a time-bucketed supply chain planning problem, supply chain network 100 may be modeled to represent the flow materials and resources between the supply chain entities in accordance with the constraints at each time bucket.

Figure 5:
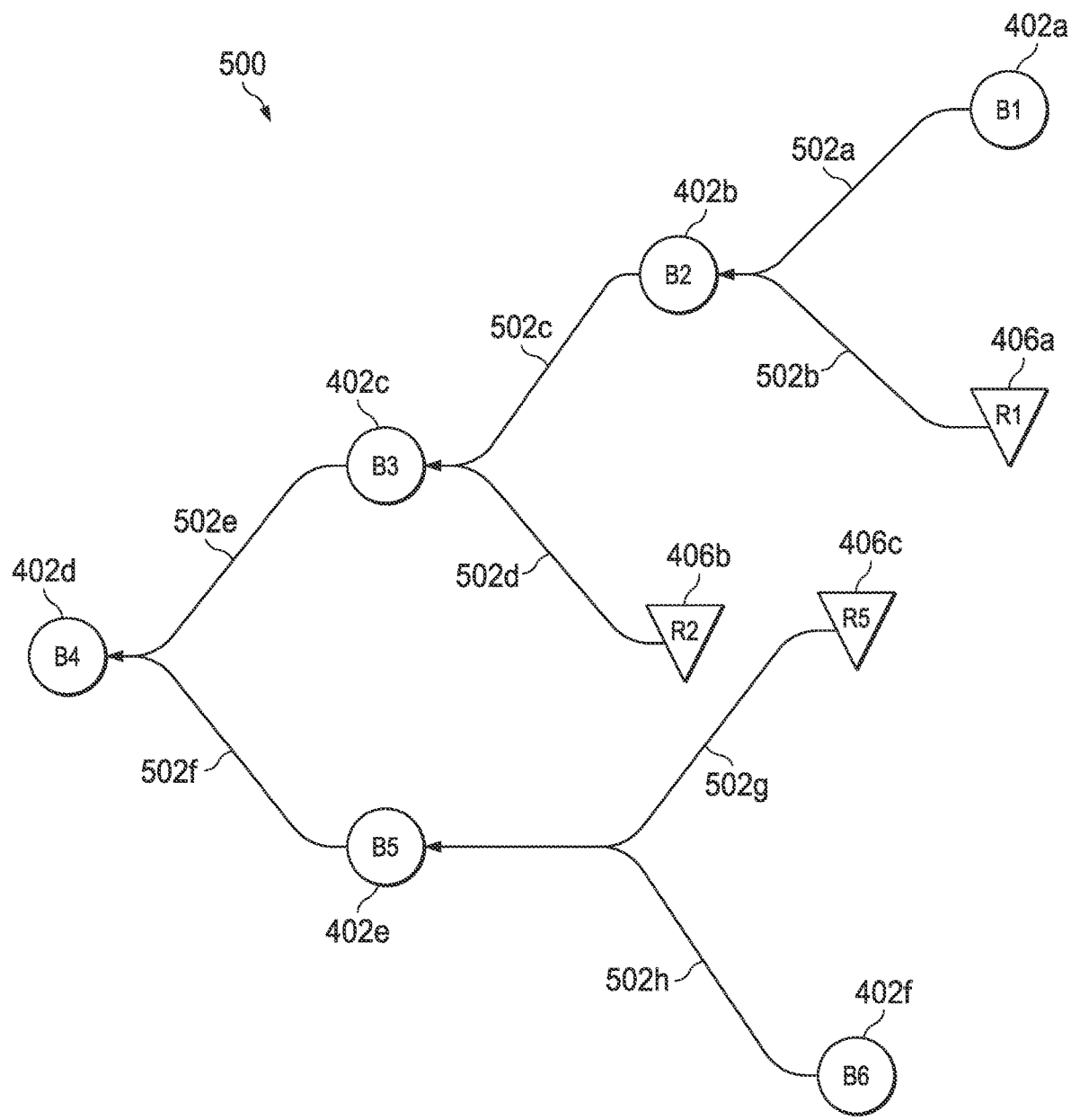
FIG. 5 illustrates a single period supply chain graph, in accordance with an embodiment.

FIG. 5 illustrates single period supply chain graph 500, in accordance with an embodiment. Single period supply chain graph 500 comprises material buffer nodes 402*a*-402*f* (B1, B2, B3, B4, B5, and B6), which indicate a particular item at a particular location in supply chain network 100. Material buffer nodes 402*a*-402*f* correspond to storage constraints of material buffer nodes 402*a*-402*f* of supply chain network chart 400. Resource buffer nodes 406*a*-406*c* (R1, R2, and R5) indicate a resource having a particular capacity, such as, for example, transportation, manufacturing, or other activities, and correspond to resource buffer nodes 406*a*-406*c* of simplified supply chain network 400. Each of edges 502*a*-502*h* represent consumption, production, or loading of an item or resource from one or more material buffer nodes 402*a*-402*f* or one or more resource buffer nodes 406*a*-406*c* to one or more other material buffer nodes 402*a*-402*f* or resource buffer nodes 406*a*-406*c*. By way of example only and not by way of limitation, edges 502*a*-502*b* connecting material buffer node B1 402*a* and resource buffer node R1 406*a* to material buffer node B2 402*b*, indicate that a supply of materials from material buffer B1 and a capacity of a resource at resource buffer R1 are consumed to generate the material represented by material buffer node B2 402*b*. Material buffer nodes 402*a*-402*f* or resource buffer nodes 406*a*-406*c* of single period supply chain graph 500 are connected across time buckets to form multi-period supply chain graph 600 (FIG. 6), which illustrates the flow of materials and resources between material buffer nodes 402*a*-402*f* or resource buffer nodes 406*a*-406*c* of the same or different time buckets.

Figure 6:
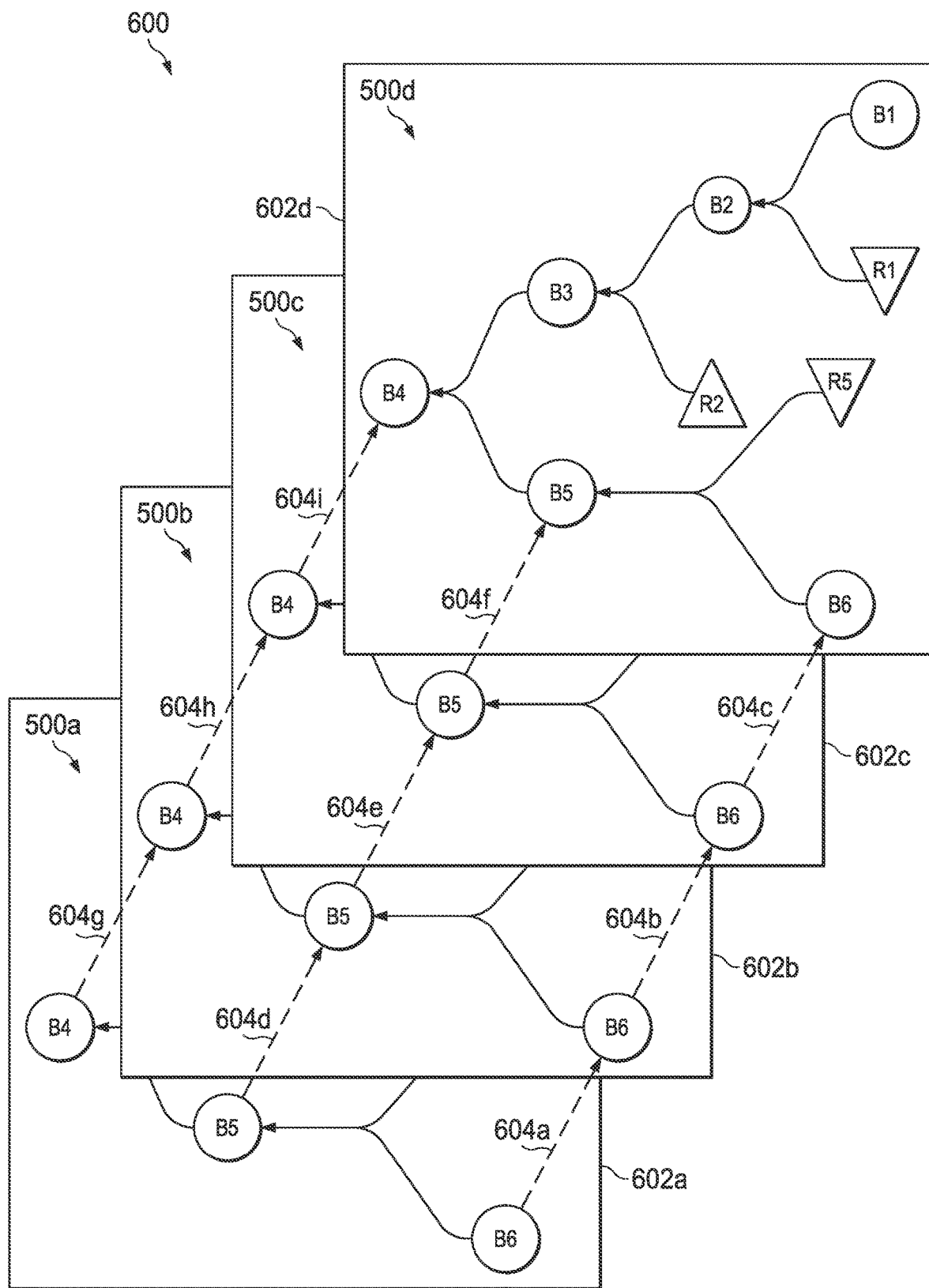
FIG. 6 illustrates a multi-period supply chain graph, in accordance with an embodiment.

FIG. 6 illustrates multi-period supply chain graph 600, in accordance with an embodiment. Multi-period supply chain graph 600 comprises a graphical representation of a multi-period supply chain data model of data models 210. Multi-period supply chain graph 600 comprises a planning horizon divided into time buckets, represented by leaves 602*a*-602*d*. Each of leaves 602*a*-602*d* comprise one single-period supply chain graph 500*a*-500*d*. Arcs 604*a*-604*i* crossing between leaves 602*a*-602*d* represent materials and resources flowing between nodes of different time buckets. For example, arcs 604*a*-604*i* between material buffer nodes 402*a*-402*f* and resource buffer nodes 406*a*-406*c* in different time buckets represent materials and resources flowing from a node in one time bucket to a node in another time bucket. The flow of materials and resources between nodes in different time buckets indicates the time needed to complete the operation (such as, for example, to transform a first item into a different item, transport an item at a first location to the same item at a second location, and other like operations) is longer than the time period represented by the time bucket. Multi-period supply chain graph 600 comprises a planning horizon with four time buckets and three time bucket boundaries. A planning horizon is the duration of the time period covered by the supply chain planning problem, such as, for example, one year. The planning horizon is divided into discrete time periods referred to as time buckets, which may comprise, for example, daily buckets, weekly buckets, monthly buckets, quarterly buckets, or the like. Although the planning horizon is described as one year and the time buckets are described as daily buckets, weekly buckets, monthly buckets, or quarterly buckets, embodiments contemplate a planning horizon comprising any suitable planning period divided into any number of time buckets having time periods of any suitable duration, according to particular needs. As disclosed above, modeler 202 may use supply chain chart 400, single-period supply chain graph 500, multi-period supply chain graph 500, or other suitable supply chain models to formulate one or more LP supply chain planning problems, such as, for example, one or more LP constraint-variable matrices.

Figure 7:
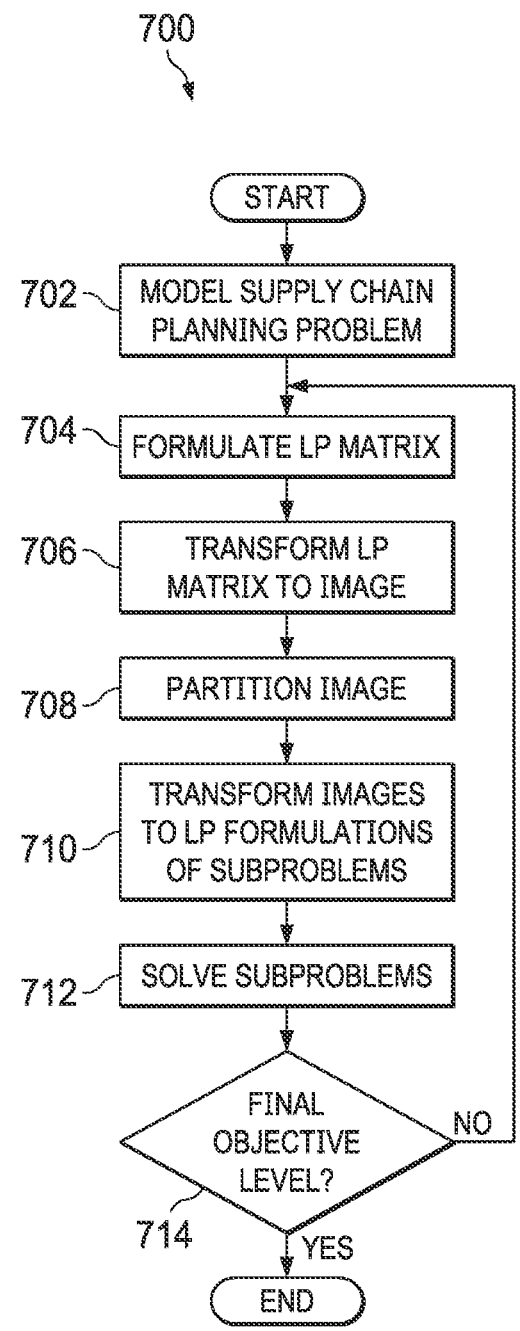
FIG. 7 illustrates a method of image-based decomposition, in accordance with an embodiment.

FIG. 7 illustrates method 700 of image-based decomposition, in accordance with an embodiment. Method 700 proceeds by one or more activities, which although described in a particular order, may be performed in one or more permutations, according to particular needs. Method 700 begins at activity 702 when modeler 202 models supply chain network 100, and, at activity 704, modeler 202 formulates an LP supply chain planning problem as LP constraint-variable matrix. By way of explanation and not by way of limitation, method 700 is described in connection with the following exemplary workflow of FIG. 8.

Figure 8:
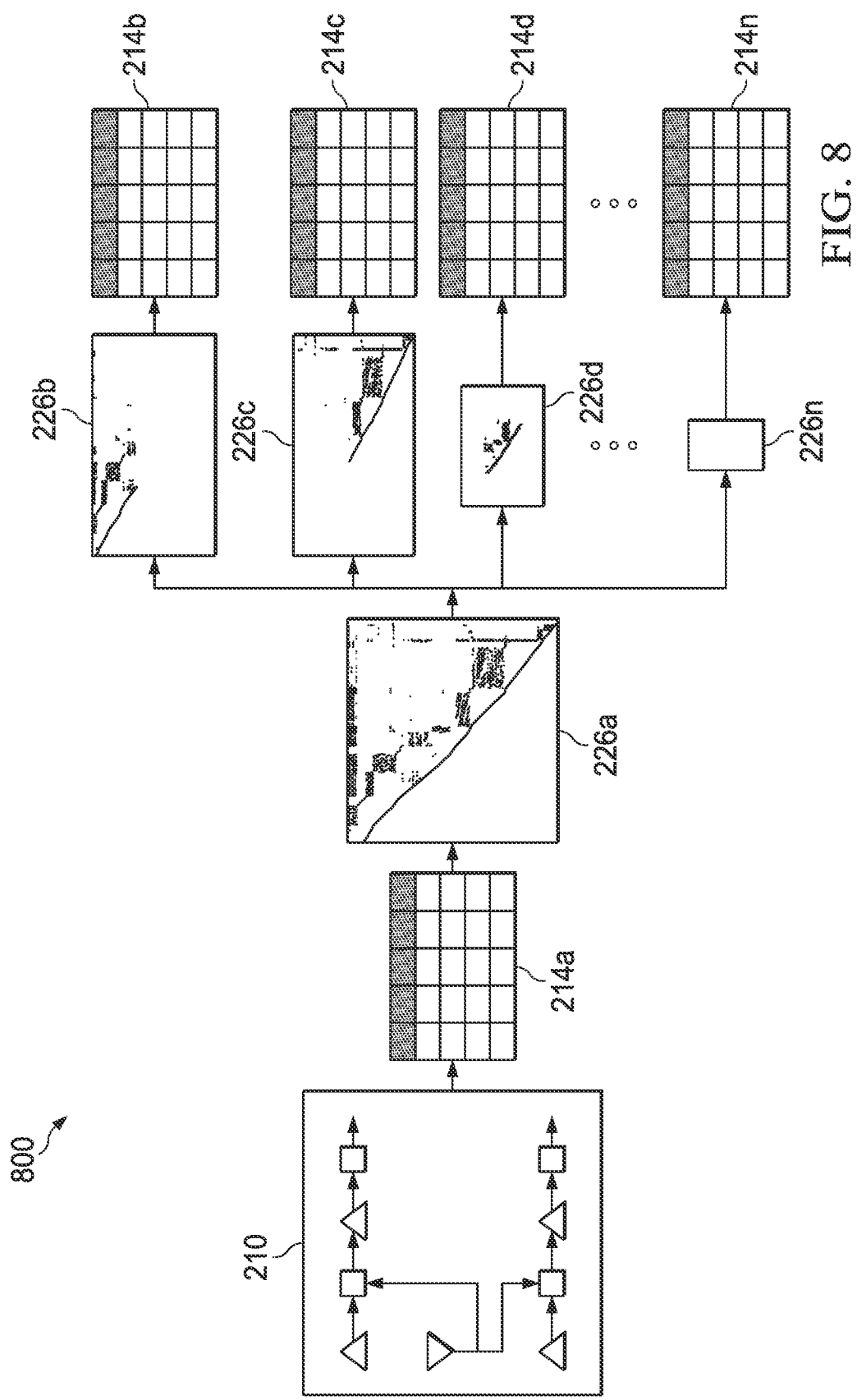
FIG. 8 illustrates an exemplary workflow of decomposing an LP supply chain planning problem using the image-based decomposition method of FIG. 7, in accordance with an embodiment.

FIG. 8 illustrates an exemplary workflow 800 of decomposing an LP supply chain planning problem using image-based decomposition method 700 of FIG. 7, in accordance with an embodiment. According to embodiments, workflow 800 comprises exemplary data structures (such as, for example, data models 210, LP formulations 214, and images 226) generated or used by supply chain planner 110 when performing one or more activities of method 700 of image-based decomposition. For example, supply chain planner 110 preprocesses supply chain input data 212 to create one or more data models 210. One or more data models 210 are received by modeler 202, which formulates an LP supply chain planning problem, such as, for example, LP formulation 214a comprising an LP constraint-variable matrix, as described at activities 702 and 704.

Image rendering engine 208 converts the LP constraint-variable matrix into one or more images at activity 706. Referring to exemplary workflow 800, image rendering engine 208 processes the LP constraint-variable matrix of LP formulation 214a and generates image 226a that represents the LP supply chain planning problem, as described in further detail below.

At activity 708, image processing engine 210 utilizes computer vision to partition one or more images 226 into one or more other images 226 based, at least in part, on the identification of clusters and contours in the image. As described in further detail below, image processing engine 210 identifies which contour, when removed, generates images representing balanced subproblems. By way of example only and not by way of limitation, image processing engine 210 partitions image 226a into one or more images 226b-226n representing independent clusters of the LP supply chain planning problems.

At activity 710, image rendering engine 208 transforms one or more images 226 representing one or more partitioned clusters back into LP formulations 214. Continuing with exemplary workflow 800, image rendering engine 208 receives one or more images 226a-226n representing independent clusters of the LP supply chain planning problem and transforms one or more images 226a-226n into LP formulations 214b-214n, such as, for example, LP constraint-variable matrices, which represent decomposed subproblems of the original LP supply chain planning problem of LP formulation 214a.

At activity 712, solver 206 receives LP formulations 214 of the decomposed subproblems and solves for solutions of the one or more subproblems. As described in further detail below, solver 206 uses masterless iteration with subgradient descent, a standard decomposition technique (e.g. Dantzig-Wolfe, Bender's, or the like), or other suitable methods to solve LP formulations 214 for an optimal or feasible solution to LP supply chain planning problem. Although particular techniques are disclosed and described, embodiments contemplate other suitable methods of solving LP supply chain planning subproblems for a solution of the original LP supply chain planning problem.

At activity 714, decomposition module 204 checks whether the current objective level is the final objective level, and, when the current objective level is not the current objective level, method 700 continues to activity 716, where decomposition module 204 fixes variables at their bounds, loads the next objective, and returns to activity 702, where modeler 202 formulates LP formulation 214 for the next objective level. When decomposition module 204 checks the current objective level at activity 714 and the current objective level is the final objective level, method 700 ends.

Figure 9:
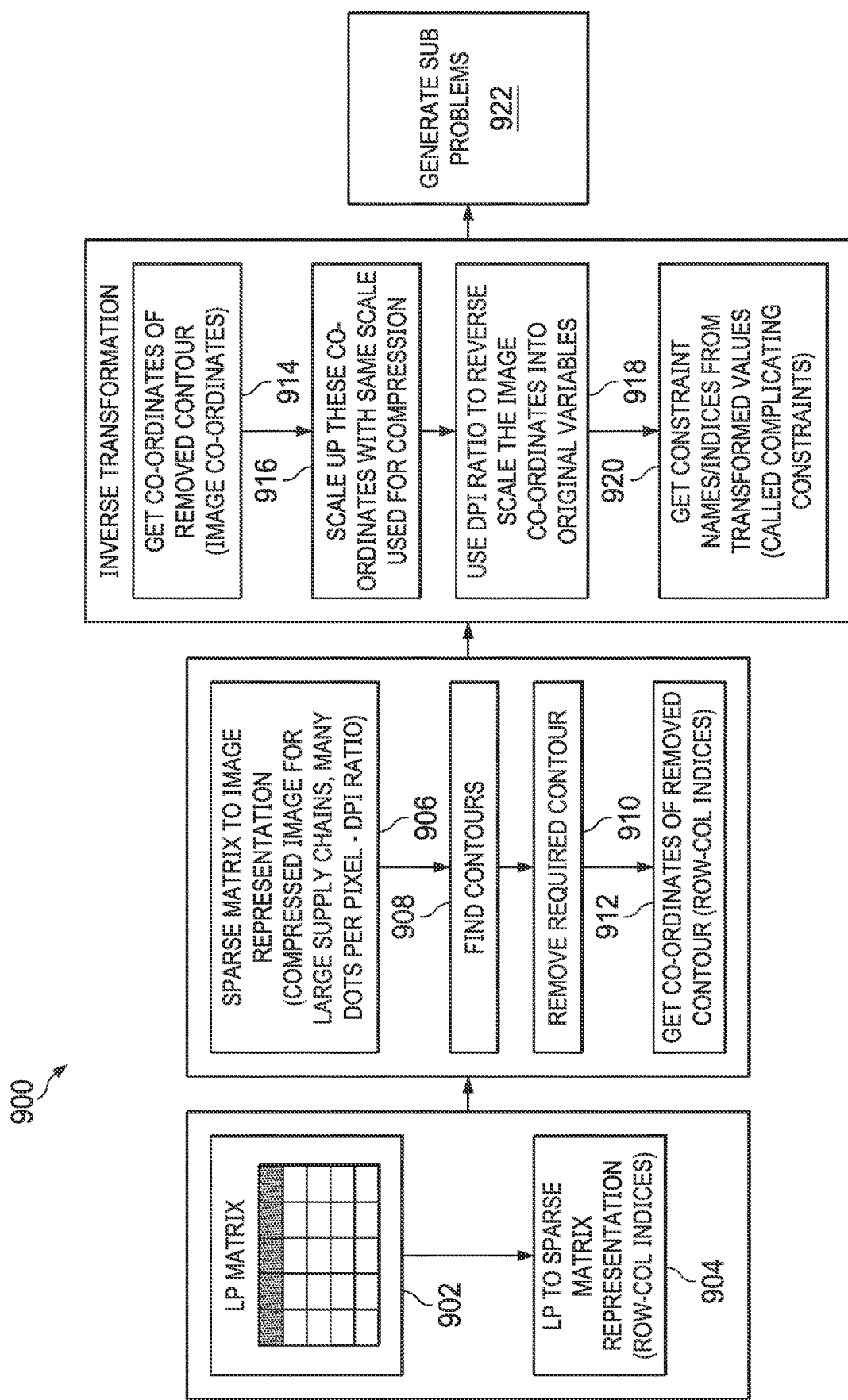
FIG. 9 illustrates an image-based partitioning method, in accordance with an embodiment.

FIG. 9 illustrates image-based partitioning method 900, in accordance with an embodiment. Image-based partitioning method 900 proceeds by one or more activities, which although described in a particular order may be performed in one or more permutations, according to particular needs.

At activity 902, solver 206 generates LP formulations 214 from one or more data models 210. As disclosed above, modeler 202 receives the supply chain static structure and supply chain dynamic structure to model one or more data models 210 having space-time sorted nodes. According to embodiments, space-time sorted nodes represent nodes of one or more supply chain entities 150, such as, for example, a buffer, a capacity, and a manufacturing process, a distribution process, or other like operation, at some location for a given time bucket stored in ascending or descending order, such as, for example, supply chain chart 400, single-period supply chain graph 500, multi-period supply chain graph 600, or other model.

At activity 904, solver 206 generates sparse matrix representation of LP formulations 214. The sparse matrix comprises constraint-variable elements stored as row-column sparse pairs. Although the number of rows and columns and their orders are generally the same as in LP formulations 214, embodiments contemplate sorting constraints and/or variables to generate sorted variable index and/or sorted constraint index using any suitable sorting technique. By way of example only and not by way of limitation, after one or more intermediate changes to LP matrix, image rendering engine 208 sorts variables and/or constraints using space-time sorted nodes from one or more data models 210. According to embodiments, modeler 202 may use one or more of various indexing schemes, including, time-based indexing, where for each time bucket i=1 . . . T, all the supply chain elements are collected (such as, for example, Op1T1, Op2T1, Op3T1, Op1T2, Op2T2, Op3T2, and the like); LP-based indexing, where modeler 202 assigns to supply chain elements the assignment given by LP formulations 214; and time-bucket-variable (Tb+Var) indexing, where, each supply chain element and its time is indexed bucket-wise (such as, for example, Op1T1, Op1T2, Op2T1, Op2T2, Op3T1, Op3T2, and the like).

At activity 906, image rendering engine 208 generates images 226 from sparse matrix representation of LP formulations 214. Using computer vision methods, image rendering engine 208 produces one or more images 226 wherein white pixels in each image represent links between supply chain constraints and variables (e.g. a variable represents a possible range of values the supply chain components in the structure can take for a given period of time). In addition, or as an alternative, when LP formulations 214 are larger than a predetermined size, image rendering engine 208 applies compression ratios and coordinates scaling to downscale images 226 of LP formulations 214. For example, a compression ratio (which may, comprise, for example, a DPI (dots per inch) ratio) is selected based on the number of variables and constraints in LP formulations 214. Different DPI ratios may be selected for plotting images 226 based on the size of the LP matrix. According to one exemplary embodiment, the compression ratio may be calculated by setting the maximum pixel per axis equal to $2^{15}=32,768$. In other words, the compression ratio=max(1, number of variables/constraints/$2^{15}$).

At activity 908, image processing engine 210 identifies contours using OPEN CV, a real-time computer vision open-source software library. Contours are the complicating, connecting parts of images 226. Clusters are parts of images 226 that are independent when contours are removed. Continuing the example of the black and white image described at activity 906, image processing engine 210 identifies a white contour and two or more white clusters in one or more images 226 (such as, for example, exemplary images 226a-226n). According to embodiments, clusters represent the number of smaller supply chain components and contours represent connecting flows among the components for a given supply chain structure. For example, image processing engine 210 identifies a complicating constraint that links two or more supply chains into a single larger supply chain network 100 by applying computer vision to identify contours of images 226. In one embodiment, a deep-learning framework, such as, for example, a Convolutional Neural Network (CNN), may be used to train a machine-learning model to identify contours using contour-labeled images received from image processing engine 210.

At activity 910, image rendering engine 208 removes one or more contours from images 226. As described in further detail below, image processing engine 210 iteratively removes contours from images 226 to identify complicating constraints and the components of the supply chain connected by the complicating constraints. Each of the contours comprises one or more white pixels representing links between variables and constraints in the original LP problem. Image processing engine 210 locates the pixels of the contours using coordinates. In one embodiment, the coordinates represent variable, constraint pairs. Image processing engine 210 identifies the coordinates for the one or more removed contours at activity 912.

At activity 914, image processing engine 210 receives coordinates of the one or more removed contours.

Image processing engine 210 upscales coordinates using the same scale used for compression, at activity 916, and reverse scales the coordinates of images 226 into original variables, at activity 918. Using the DPI ratio, as disclosed above, and the mapping of the row-column pair spare matrix, image processing engine 210 determines the row-column of each component.

At activity 920, images processing engine 210 determines the constraints from the transformed values. According to an embodiment, after reverse scaling, the indices of the variables and constraints, the sparse pairs, and the mapping of indices-to-constraint-names identifies the constraint names from the transformed values. At activity 922, solver 206 generates decomposed subproblems. According to an embodiment, image processing engine 210 creates a constraint list for each subproblem. The constraint list may comprise the subproblem constraints and the complicating constraints that are part of the removed contour. Solver 206 receives the identity of the subproblem constraints and the complicating constraints and, in response, formulates the decomposed subproblems by reading the original LP problem and based, at least in part, on the subproblem constraints and the complicating constraints of the constraint list.

Figure 10:
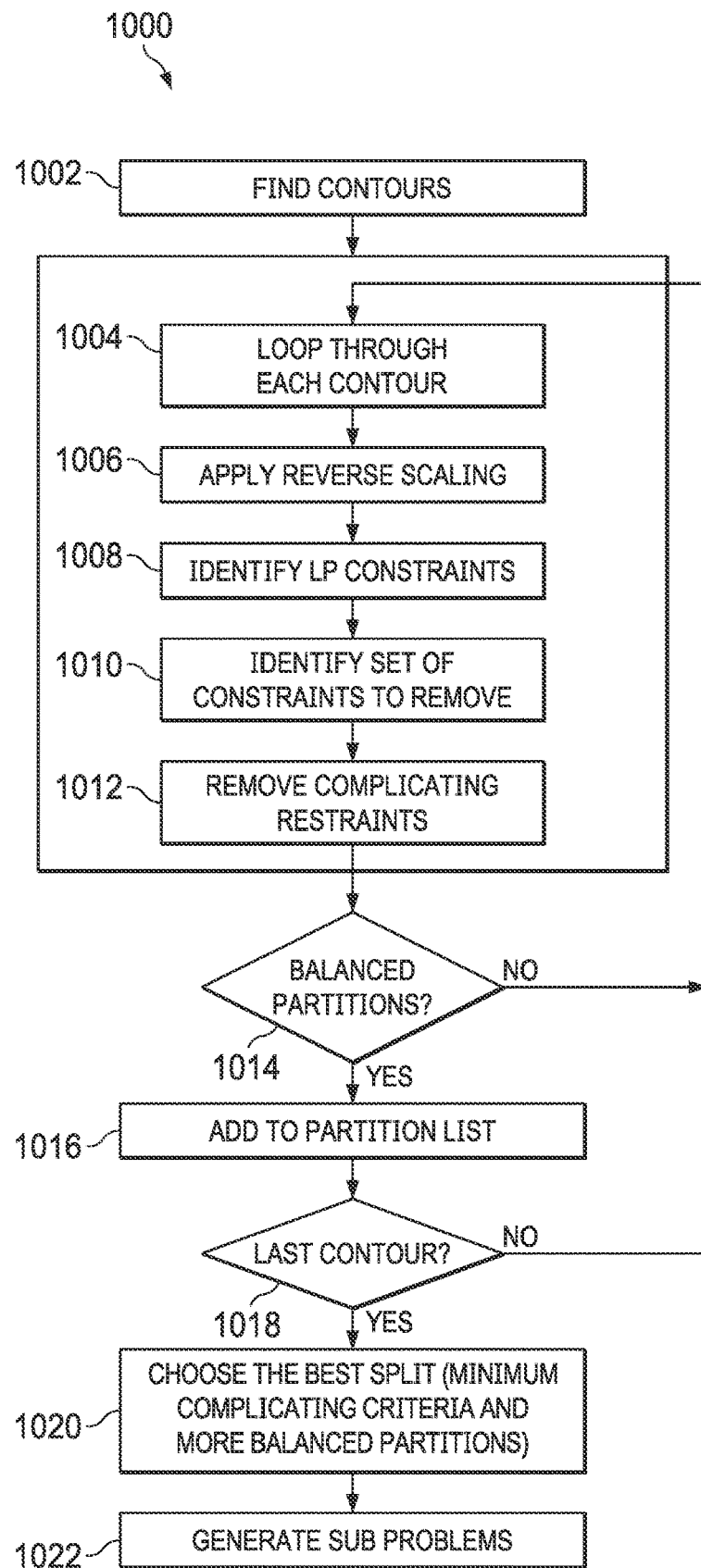
FIG. 10 illustrates partition selection method, in accordance with an embodiment.

FIG. 10 illustrates partition selection method 1000, in accordance with an embodiment. Partition selection method 1000 proceeds by one or more activities, which although described in a particular order may be performed in one or more permutations, according to particular needs.

Partition selection method 1000 begins at activity 1002 when image processing engine 210 identifies contours, as disclosed above. According to embodiments, method 1000 identifies partitions by iteratively removing contours and checking whether the resulting partition generates balanced subproblems. According to one embodiment, after identifying one or more contours of images 226, image processing engine 210 selects one contour at activity 1004 and applies reverse scaling at activity 1006. As disclosed above, reverse scaling comprises mapping from coordinate points representing contours to row-column (constraint-variable) indices using the DPI ratio, which are used by image processing engine 210 to identify the LP constraints for the current contour, at activity 1008. Filtering by variable types and/or time buckets, image processing engine 210 identifies a subset of constraints, at activity 1010, which are determined to be complicating constraints. Removing complicating constraints generates the connected components at activity 1012. At activity 1014, decomposition module 204 checks whether the partitions are balanced when the complicating constraints are removed. By way of example only and not by way of limitation, partitions are balanced when the size of the generated subproblems have the same or a similar proportion. Continuing the example, when decomposition generates two subproblems by removing complicating constraints, decomposition module 204 determines the partition is balanced when the ratio of the size of a first subproblem (or the number of constraints of the first subproblem) to the size of a second subproblem (or the number of constraints in the second subproblem) is between approximately 0.8 and 1.2. Although a balanced partition is described as a particular ratio of the size or number of constraints of two subproblems, embodiments contemplate other suitable ratios or criteria for selecting balanced partitions generated balanced subproblems, according to particular needs.

When the partitions are balanced, decomposition module 204 adds the partition to the partition list at activity 1016 before continuing to activity 1018, to check whether the current contour is the last contour. When the current contour is not the last contour or when the partitions are not balanced at activity 1014, method 1000 returns to activity 1004. Method 1000 may then iteratively repeat activities 1004-1012. When the last contour is detected at activity 1018, decomposition module 204 continues to activity 1020 to select the one or more partitions that generates balanced partitions with minimum complicating criteria.

According to embodiments, partitions may be combined from more than one subproblem. When generating two subproblems from more than one partition, embodiments contemplate beginning with connected component and iteratively adding a larger component until the sum of the components has an approximately equal size to the largest component. When generating three subproblems, embodiments contemplate beginning from the smallest component and iteratively adding larger components until the sum of their sizes reaches the second largest component. Although a particular method for combining components into two and three subproblems are described, embodiments any suitable method for combining any number connected components into any number of subproblems, according to particular needs.

According to embodiments, one objective of the partition split is minimizing the number of complicating constraints while generating balanced partitions, to improve the speed of a decomposition algorithm, such as, for example, Dantzig-Wolfe, Benders, masterless iteration with subgradient descent (as described in further detail below), and the like. Method 1000 ends when solver 206 generates the decomposed subproblems at activity 1022, as disclosed above.

As disclosed above, one technique that supply chain planner 110 may use to solve the two or more subproblems is masterless iteration with subgradient descent. According to embodiments, supply chain planner 110 updates the RHS of complicating constraints, iteratively, and tries to find the best assignment using dual values, to achieve the optimum solution, as described in further detail below.

Figure 11:
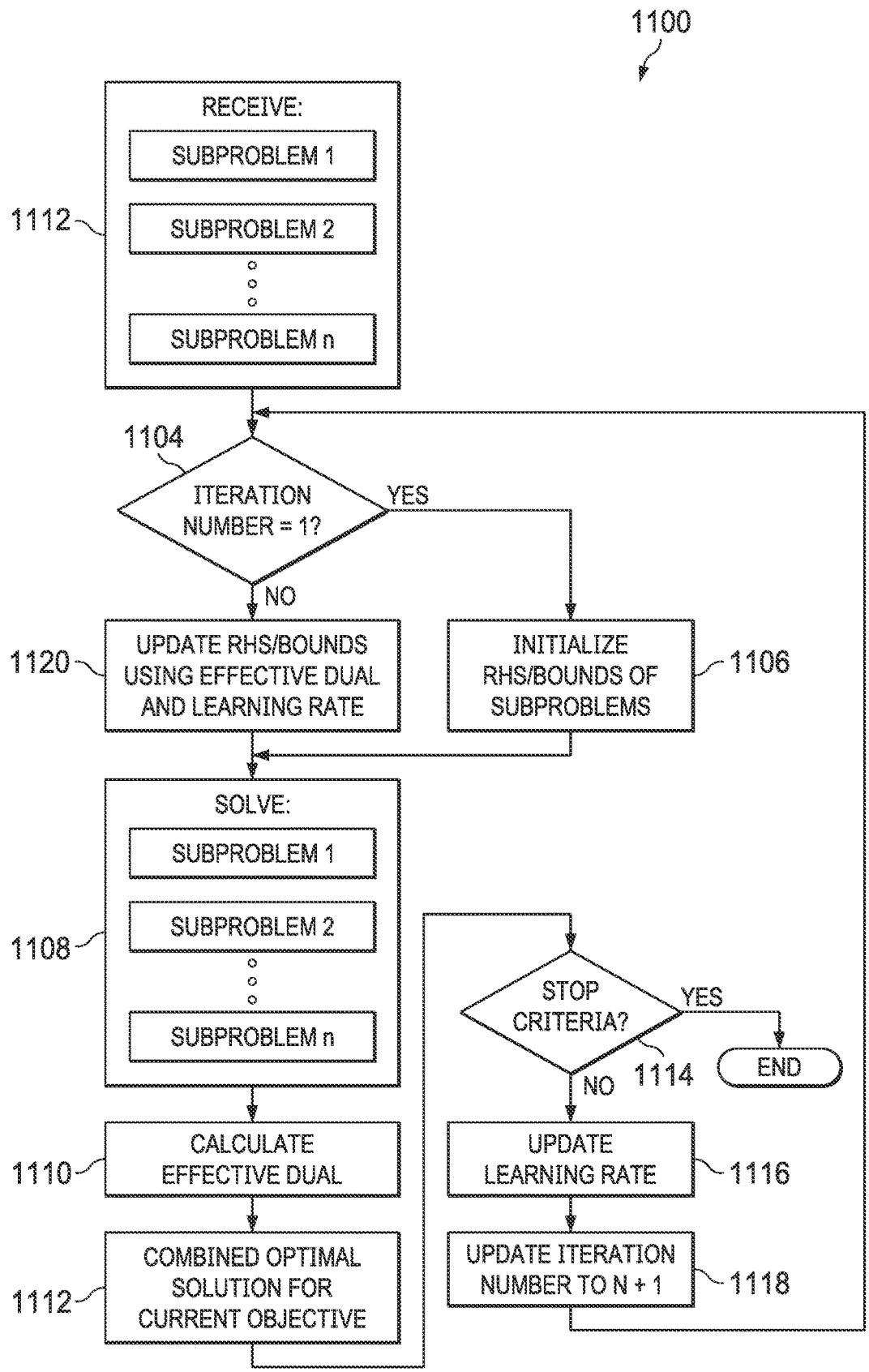
FIG. 11 illustrates a method of solving image-based decomposed subproblems using masterless iteration, in accordance with an embodiment.

FIG. 11 illustrates method 1100 of solving image-based decomposed subproblems using masterless iteration, in accordance with an embodiment. Exemplary method 1100 proceeds by one or more activities, which although described in a particular order may be performed in one or more permutations, according to particular needs. Method 1100 begins at activity 1102 where decomposition module 204 accesses image-based decomposed subproblems (Subproblem 1, Subproblem 2 . . . Subproblem n). As disclosed above, each of image-based decomposed subproblems comprise LP formulations of the LP supply chain planning problem split by removing one or more contours representing one or more complicating constraints.

At activity 1104, decomposition module 204 checks whether the current iteration is the first iteration (i.e. whether the current iteration number is equal to one). When the current iteration is the first iteration, method 1100 continues to activity 1106 when decomposition module 204 transmits the image-based decomposed subproblems to solver 206, and solver 206 initializes the Right Hand Side (RHS) and/or the variable bounds of the image-based decomposed subproblems. According to embodiments, the sum of the RHS of the image-based decomposed subproblems equals the RHS of the LP supply chain planning problem, and solver 206 allocates all of the capacity or material of the complicating constraint of the LP supply chain planning problem to the complicating constraints of the image-based decomposed subproblems, such that the total capacity and material allocated to image-based decomposed subproblems equals 100% of the capacity or material of the LP supply chain master problem.

At activity 1108, solver 206 solves the image-based decomposed subproblems. According to one embodiment, solver 206 solves the image-based decomposed subproblems using LP optimization. As disclosed above, each of the image-based decomposed subproblems comprises its own objectives, constraints, and variables. Complicating constraints are common to two or more of the image-based decomposed subproblems. Each of the complicating constraints is split on the RHS of the subproblems, and, when solver 206 solves image-based decomposed subproblems, a dual value is calculated for each of the constraints of the image-based decomposed subproblems.

At activity 1110, solver 206 uses the calculated duals to calculate an effective dual. According to the embodiments, the effective dual is the mathematical difference of the dual values of the complicating constraints of the image-based decomposed subproblems. By way of example only and not of limitation, when a dual value of a first subproblem equals one hundred and a dual value of a second subproblem equals twenty-five, solver 206 calculates the effective dual as seventy-five. Although the effective dual is described as a difference of two dual values for a single complicating constraint, embodiments contemplate calculating effective duals for any number of subproblems and any number of complicating constraints, according to particular needs.

At activity 1112, solver 206 combines the solutions of each of the subproblems for the current objective. The final solution (objective values) is the sum of objective values (solutions) of each of the subproblems. At activity 1114, decomposition module 204 checks for one or more stopping criteria. According to an embodiment, one or more stopping criteria may comprise detecting the globally-optimal LP solution. In this embodiment, method 1100 ends when solver 206 determines that the current solution is the globally-optimal LP solution. Additionally, or as an alternative, stopping criteria may comprise one or more of an image-based interpretation of supply chain data 210, infeasibility in capacity or material less than, equal to, and/or greater than a predetermined value, percentage, or other threshold [e.g. a material is over or under consumed, or a capacity is over or under consumed.] In addition, or as an alternative, stopping criteria comprise detecting a value of infeasibility and/or suboptimality for the solve exceeds a threshold while solving the image-based decomposed subproblems. According to an embodiment, a threshold is a preselected tolerance for infeasibility and suboptimality which, when met or exceeded, method 1100 ends. By way of example only and not of limitation, supply chain planner 110 sets a threshold for a resource at 0.01%. When solver 206 determines a solution utilizes the resource ±1% of the actual availability and finds a converging point, decomposition module 204 stops correcting the 1% infeasibility. According to embodiments, the infeasibility tolerance comprises a threshold value for one or more material flows. In addition or as an alternative, stopping criteria comprise a suboptimality tolerance that sets a minimum difference between the objective value of iterative solutions. For example, when solver 206 detects that a difference between a number of previous consecutive iterations of the objective value (such as, for example, five iterations) is less than a preselected suboptimality threshold, decomposition module 204 ends the solve. Although the stopping criteria are described as particular values of infeasibility and suboptimality thresholds, embodiments contemplate the infeasibility and suboptimality tolerances comprising any threshold, according to particular needs.

At activity 1116, decomposition module 204 updates the learning rate. According to an embodiment, decomposition module 204 updates the learning rate during each iteration by dividing the previous learning rate by a factor calculated as the square root of the current iteration number. For the first iteration, the learning rate does not change because the factor for the first iteration is equal to one (i.e. the square root of one is one). At a second iteration, the learning rate may be calculated by dividing the learning rate of the first iteration by the square root of two. Similarly, for the third iteration, the learning rate may be calculated by dividing the learning rate of the second iteration by the square root of three; the fourth iteration's learning rate is the learning rate of the third iteration divided by two (i.e. the square root of four); and so on.

After increasing the iteration counter by one at activity 1118, method 1100 returns to activity 1104, where decomposition module 204 again evaluates the current iteration number. The current iteration is the second iteration, iteration number is equal to two, and method 1100 continues to activity 1120, where solver 206 updates the RHS bounds using the current effective dual and learning rate. As disclosed above, solver 206 initializes the RHS of the image-based decomposed subproblems so that the sum of the RHS of the image-based decomposed subproblems is equal to the RHS of the master LP problem. According to one embodiment, modeler 202 updates the RHS of the complicating constraints, iteratively, and tries to find the best assignment using dual values, to achieve the optimum solution. Modeler 202, decomposition module 204, and solver 206 of supply chain planner 110 continue to iteratively model, decompose, and solve the subproblems of the multi-objective hierarchical LP problem until it reaches the final objective or one or more other stopping criteria. In response to detecting one or more stopping criteria, such as, for example, solving the last objective in the hierarchy of objectives, solver 206 combines the solution of each of the independent subproblems to generate the globally-optimal LP solution. In addition, although particular activities of the method are described as performed by modeler 202, decomposition module 204, or solver 206, embodiments contemplate using any of these or other suitable modules specifically configured to perform these activities, according to particular needs.

As disclosed above, method 1100 generates a globally-optimal LP solution to a LP supply chain planning problem. Although method 1100 is shown and described as generating the globally-optimal LP solution by solving image-based decomposed subproblems using a heuristic solver and applying masterless iteration with subgradient descent, embodiments contemplate generating globally-optimal LP solution and solving image-based decomposed subproblems using any one or more optimization or heuristic solvers, other methods of masterless iteration, and/or other subgradient methods, according to particular needs. In addition, although method 1100 is described as generating the globally-optimal LP solution, embodiments contemplate infeasible problems, wherein method 1100 stops. This infeasibility may however be translated to image-based information to identify a new stopping criteria or provide additional insight into the supply chain planning problem for supply chain planner 110. Embodiments also contemplate, when the solution to the subproblems is infeasible, adding virtual variables that make the problem feasible, and, later, removing them.

Because image-based decomposition method 700 provides for speeding up the run time for generating globally-optimal LP solutions to supply chain master planning problems, batch runs (e.g., daily, weekly, and the like) may be performed in less time, and changes in customer data may be addressed sooner (e.g., an intraday rerun of optimization based on changes in data).

Figure 12A:
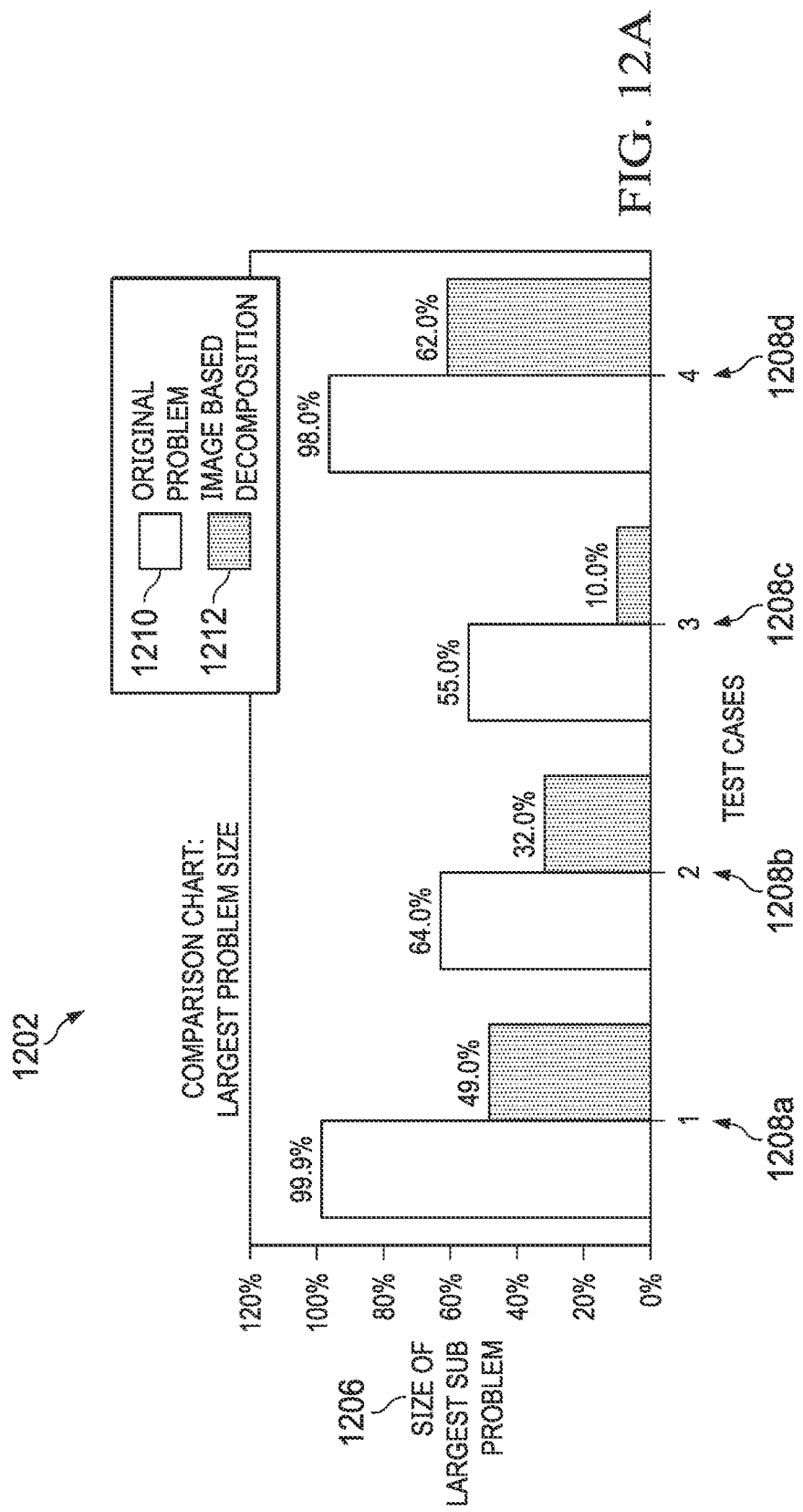

FIGS. 12A-12B illustrate chart 1202 and table 1204 comparing the largest subproblem size of the original LP optimization problem and the largest subproblem size of the image-based decomposition, in accordance with an embodiment. Chart 1202 illustrates the largest subproblem size 1206 for four test cases 1208a-1208d for original LP optimization problem 1210 and image-based decomposition method 700 problem 1212. Image-based decomposition method 700 reduces the largest problem size by at least 62% in test case four 1208d and to as small as 10% of the original subproblem size as in test case three 1208c.

Results for test cases 1208a-1208d comprise number of constraints in original LP problem (Number of Constraints 1220); number of components in original LP problem (Original Prob. (Number of Components) 1222); largest problem size in original LP problem (Largest Problem Size (Orig.) 1224); number of components after image-based decomposition method 700 (Image-Based Decomposition (Number of Components) 1226); largest subproblem size after image-based decomposition method 700 (Largest Problem Size (Decomposed) 1228); and the number of complicating constraints in decomposed LP problem divided by the number of total constraints in original LP problem (% Complicating Constraints 1230). Image-based decomposition method has been validated as creating significant improvement in decomposition methods on problems at least as large as 1.8 million constraints (Number of Constraints 1220), and at least as many as 4,200 components (Original Prob. (Number of Components) 1222) by reducing subproblem size from as high as 99% (Largest Problem Size (Orig.) 1224) to as little as 10% (Largest Problem Size (Decomposed) 1228) with over 5,300 independent subcomponents (Image-Based Decomposition (Number of Components) 1226) with test cases 1208a-1208d having an approximately similar percentage of complicating constraints 5-8% (% Complicating Constraints 1230). Solving the independent subproblems in parallel (by, for example, increasing the number of components, which accordingly have a decreased problem size over original LP problem using image-based decomposition method 700) greatly increases the functionality of the computer by increasing solving speed. Test cases 1208a-1208d validate the performance benefit for using image-based decomposition method 700 over a standard LP optimization method.

FIGS. 13-18 illustrate transformations of exemplary datasets according to method 700 of image-based decomposition of FIG. 7, in accordance with an embodiment. FIG. 13 illustrates chart 1300 summarizing changes in connected supply chain components in response to removal of variable types from contour, in accordance with an embodiment. Chart 1300 comprises type of contour removal (df_nm) 1310, number of connected components 1312: number of variables in largest component (#First Split Size (Vars)) 1314, number of variables in remaining components (#Rest Split Size (Vars)) 1316, percentage of variables (Rest Split in %) 1318, remaining edges 1320, and removed edges 1322. As described in further detail below, number of connected components 1312 is the quantity of connected components in images 226 after removal of variables from the largest contour according to type of contour removal 1310. According to embodiments, the size of the contour is determined by the number of rows it covers. In this example, the largest contour is the contour that covers the most rows. Number of variables in largest component 1314 is the quantity of variables in the decomposed subproblem created from the largest component after performing the indicated type of contour removal 1310.

Number of variables in remaining components 1316 is the quantity of variables in the decomposed subproblems created from all components except the largest component. Percentage of variables 1318 is the fraction (expressed as a percentage) of the variables of the rest split size over the total variables available in the original LP problem. Remaining edges 1320 is the quantity of edges after performing the indicated type of contour removal 1310, and removed edges 1322 is the quantity of edges removed after performing the indicated type of contour removal 1310.

To further explain, an example is now given for the contour removal examples of chart 1300. Although in the following example, particular types of contour removal 1310 are performed and result in particular quantities or values indicated in chart 1300, embodiments contemplate selected one or more of these (or other) types of contour removal resulting in other suitable decomposed subproblems, according to particular needs.

Original DF 1330 comprises the values for the connected components before removal of any contour from the image of the original LP problem. Chart 1300 summarizes the results for dataset "1540" which, prior to contour removal (Original DF 1330), comprises 962 connected components connected by a total of 702,637 edges and having 306,009 variables in the decomposed subproblem representing the largest component, and 65,269 variables remaining in the remaining supply chain components, which represents 82% of the total variables. The types of contour removal used to simplify the original LP problem and generate balanced decomposed subproblems comprise the following: After Removing All VARS 1332: removing the largest contour from the image; After Removing XBAL 1334: removing all pixels representing flow balance (XBAL) variables from the largest contour in the image; After Removing OP 1336: removing all pixels representing operation (OP) variables from the largest contour in the image; After Removing F 1338: removing all pixels representing backloggable demands variables from the largest contour in the image; After Removing CAP 1340: removing all pixels representing capacity variables from the largest contour in the image; After Removing AMT 1342: removing all pixels representing demand (AMT) variables from the largest contour in the image; After Removing B 1344: removing all pixels representing unrestricted backlogging variables from the largest contour in the image; After Removing SBAL 1346: removing all pixels representing infeasibility violation variables (which avoid infeasible solutions when sufficient production is given for a material buffer) from the largest contour in the image; and After Removing XBD 1348: removing all pixels representing quantity-based safety stock variables (which may also be referred to as "over max band variables," represent the amount of inventory carried over beyond specified maximum safety stock) from the largest contour in the image.

Referring to chart 1300, removal of different variable types results in a wide range of supply chain splits. For example, number of connected components 1312 ranges from as few as 923 (less than the number of the original LP problem) to as many 77,719 (by removing the largest contour).

FIG. 14 illustrates chart 1400 summarizing changes in connected supply chain components in response to removal of variable types from contour, in accordance with a second embodiment. Similarly to chart 1300, chart 1400 comprises the results of performing various types of contour removals, as disclosed above. In addition, however, chart 1400 presents results for a type of contour removal: After Removing ST 1402: removing all pixels representing alternate resource variables (which represent operations loaded from alternate resources) from the largest contour in the image. Notably, removal of capacity variables 1340, infeasibility violation variables 1346, and quantity-based safety stock variables 1348 from the contour, have no effect on the number of connected components and reduces only slightly the number of variables present in the largest component of the original LP problem represented by the image.

FIG. 15 illustrates chart 1500 summarizing changes in connected supply chain components in response to removal of variable types from contour, in accordance with a third embodiment. As disclosed above, chart 1500 comprises the results of performing various types of contour removals. Chart 1500 presents results for further types of contour removal: After Removing CR 1502: removing all pixels representing cross-over variables (which represent time-based safety stock requirements in alternate formulation networks) from the largest contour in the image; After Removing XDMD 1504: removing all pixels representing surplus variables for total-demand quantity-based constraints from the largest contour in the image; After Removing XCAP 1506: removing all pixels representing surplus variables for resource capacity constraints from the largest contour in the image; After Removing SPRP 1508: removing all pixels representing alternate operations slack violation variables from the largest contour in the image; After Removing XPRP 1510: removing all pixels representing alternate operations surplus violation variables from the largest contour in the image; and After Removing WBAL 1512: removing all pixels representing infeasibility variables for storage and balanced constraints from the largest contour in the image.

By identifying the function of the variables in the complicating constraints, the identity of the complicating buffers or other supply chain components may be identified as preventing decomposition of the supply chain planning problem. By way of example only and not by way of limitation, when complicating constraints are based on capacity variables (CAP), the resource capacity buffer is identified as constraining the decomposition of the supply chain into decomposed supply chain segment.

FIG. 16 illustrates chart 1600 summarizing the changes in connected supply chain components in response to removal of contours from images 226, in accordance with an embodiment. Chart 1600 comprises measured values for images 226 represented by original LP problem (matrix.in_dataset_orig) 1610 and the measured values for images 226 after removing the largest contour (matrix.in_removed_contour_0) 1612, the second largest contour (matrix.in_removed_contour_1) 1614, the third largest contour (matrix.in_removed_contour_2) 1616, the fourth largest contour (matrix.in_removed_contour_3) 1618, and the fifth largest contour (matrix.in_removed_contour_4) 1620. Similarly to charts 1300, 1400, and 1500, chart 1600 records the measured values for number of connected components 1312: number of variables in largest component (#First Split Size (Vars)) 1314, number of variables in remaining components (#Rest Split Size (Vars)) 1316, remaining edges 1320, and removed edges 1322. In addition, chart 1600 comprises percentage of variables (First Split in %) 1622. Percentage of variables 1622 is the fraction (expressed as a percentage) of the variables of the largest component over the total variables in the original LP problem.

By way of example only and not way of limitation, chart 1600 reports the values for as supply chain planning problem dataset "9561" having a size 1624 of 4112 megapixels. The image generated for the original LP problem of dataset "9561" comprises one connected component having 870,581 variables in the largest (and here, only, component). After removing the largest contour (matrix.in_removed_contour_0) 1612, the resulting image comprises 44,789 connected components, 2739 variables in the largest components, and 650,261 variables in the remaining components 1612. Removal of the second largest contour 1614, the third largest contour 1616, the fourth largest contour 1618, and the fifth largest contour 1620 did not result in any increase in the number of connected components.

FIG. 17 illustrates chart 1700 summarizing the changes in connected supply chain components in response to removal of contours from images 226, in accordance with an embodiment. Chart 1700 comprises results for dataset "714,110"

having a size 1624 of 4536 megapixels. Unlike the dataset illustrated by chart 1600, removal of various sized contours 1612-1620 had varying effects on the number of connected components in the image generated from the original LP problem.

FIG. 18 illustrates chart 1800 summarizing the changes in connected supply chain components in response to removal of contours from images 226, in accordance with an embodiment. Chart 1800 comprises results for dataset "9930" having a size of 445,696 megapixels. For this dataset, removal of the largest contour 1612 results in a first component having approximately 10% of the variables of the original LP problem, which may be a useful split for decomposing the original LP problems into balanced decomposed subproblems. Removal of shorter contours 1614-1620 however results in a largest component comprising approximately 94-98% of the original LP problem, which is not a balanced split of the original LP problem and would not lead to balanced decomposed subproblems.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of solving a supply chain planning problem modeled as a linear programming problem, comprising:
   a computer, comprising a processor and memory, the computer further comprising an image rendering engine, an image processing engine, a decomposition module, and a solver;
   the image rendering engine configured to:
      generate pixels of a supply chain problem image, the pixels representing links between constraints and variables of the linear programming problem;
   the image processing engine configured to:
      identify one or more contours of the supply chain problem image using a machine-learning model trained using a convolutional neural network and contour-labeled images received from the image rendering engine;
   the decomposition module configured to:
      determine a partition comprising at least two components linked by a first contour is more balanced than a partition comprising the at least two components linked by a second contour; and
   the solver configured to:
      formulate at least two decomposed subproblems sharing one or more complicating constraints associated with at least one of the one or more contours; and
      solve the at least two decomposed subproblems to generate a solution to the supply chain planning problem.

2. The system of claim 1, wherein the solver is further configured to:
   split the one or more complicating constraints on a RHS of the at least two decomposed subproblems; and
   calculate a dual value for each of one or more constraints of the at least two decomposed subproblems.

3. The system of claim 1, wherein the decomposition module is further configured to:
   update a learning rate during each iteration by dividing a previous learning rate by a factor.

4. The system of claim 1, wherein the image processing engine is further configured to:
   translate an infeasibility into image-based information to identify a new stopping criteria.

5. The system of claim 1, wherein the at least two decomposed subproblems are solved in parallel.

6. The system of claim 1, wherein stopping criteria comprise a preselected tolerance for infeasibility and suboptimality.

7. The system of claim 1, wherein the at least two decomposed subproblems are formulated using a Dantzig-Wolfe decomposition algorithm.

8. A computer-implemented method of solving a supply chain planning problem modeled as linear programing problem, comprising:
   generating pixels, by an image rendering engine, of a supply chain problem image, the pixels representing links between constraints and variables of the linear programming problem;
   identifying, by an image processing engine, one or more contours of the supply chain problem image using a machine-learning model trained using a convolutional neural network and contour-labeled images received from the image rendering engine;
   determining, by a decomposition module, a partition comprising at least two components linked by a first contour is more balanced than a partition comprising the at least two components linked by a second contour;
   formulating, by a solver, at least two decomposed subproblems sharing one or more complicating constraints associated with at least one of the one or more contours; and
   solving, by the solver, the at least two decomposed subproblems to generate a solution to the supply chain planning problem.

9. The computer-implemented method of claim 8, further comprising:
   splitting, by the solver, the one or more complicating constraints on a RHS of the at least two decomposed subproblems; and
   calculating, by the solver, a dual value for each of one or more constraints of the at least two decomposed subproblems.

10. The computer-implemented method of claim 8, further comprising:
    updating, by the decomposition module, a learning rate during each iteration by dividing a previous learning rate by a factor.

11. The computer-implemented method of claim 8, further comprising:
    translating, by the image processing engine, an infeasibility into image-based information to identify a new stopping criteria.

12. The computer-implemented method of claim 8, wherein the at least two decomposed subproblems are solved in parallel.

13. The computer-implemented method of claim 8, wherein stopping criteria comprise a preselected tolerance for infeasibility and suboptimality.

14. The computer-implemented method of claim 8, wherein the at least two decomposed subproblems are formulated using a Dantzig-Wolfe decomposition algorithm.

15. A non-transitory computer-readable medium embodied with software providing solving of supply chain planning problems modeled as linear programing problems, the software when executed:

generates, by an image rendering engine, pixels of a supply chain problem image, the pixels representing links between constraints and variables of the linear programming problem;

identifies, by an image processing engine, one or more contours of the supply chain problem image using a machine-learning model trained using a convolutional neural network and contour-labeled images received from the image rendering engine;

determines, by a decomposition module, a partition comprising at least two components linked by a first contour is more balanced than a partition comprising the at least two components linked by a second contour;

formulates, by a solver, at least two decomposed subproblems sharing one or more complicating constraints associated with at least one of the one or more contours; and solves, by the solver, the at least two decomposed subproblems to generate a solution to the supply chain planning problem.

16. The non-transitory computer-readable medium of claim 15, the software when executed further:

splits, by the solver, the one or more complicating constraints on a RHS of the at least two decomposed subproblems; and calculates, by the solver, a dual value for each of one or more constraints of the at least two decomposed subproblems.

17. The non-transitory computer-readable medium of claim 15, the software when executed further:

updates, by the decomposition module, a learning rate during each iteration by dividing a previous learning rate by a factor.

18. The non-transitory computer-readable medium of claim 15, the software when executed further:

translates, by the image processing engine, an infeasibility into image-based information to identify a new stopping criteria.

19. The non-transitory computer-readable medium of claim 15, wherein the at least two decomposed subproblems are solved in parallel.

20. The non-transitory computer-readable medium of claim 15, wherein the at least two decomposed subproblems are formulated using a Dantzig-Wolfe decomposition algorithm.

* * * * *